(12) United States Patent
Malach

(10) Patent No.: US 9,948,349 B2
(45) Date of Patent: Apr. 17, 2018

(54) IOT AUTOMATION AND DATA COLLECTION SYSTEM

(71) Applicant: Corning Optical Communications Wireless Ltd, Airport City (IL)

(72) Inventor: Adi Malach, Oranit (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/207,759

(22) Filed: Jul. 12, 2016

(65) Prior Publication Data

US 2017/0019144 A1      Jan. 19, 2017

Related U.S. Application Data

(60) Provisional application No. 62/193,642, filed on Jul. 17, 2015.

(51) Int. Cl.
    *H04B 1/46*   (2006.01)
    *H04B 1/48*   (2006.01)
    *H04W 4/00*   (2018.01)

(52) U.S. Cl.
    CPC .............. *H04B 1/48* (2013.01); *H04W 4/008* (2013.01)

(58) Field of Classification Search
    USPC .................................. 455/79, 7, 15, 19, 561
    See application file for complete search history.

(56) References Cited

U.S. PATENT DOCUMENTS

| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |

(Continued)

FOREIGN PATENT DOCUMENTS

| AU | 645192 B | 10/1992 |
| AU | 731180 B2 | 3/1998 |

(Continued)

OTHER PUBLICATIONS

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.

(Continued)

*Primary Examiner* — Fayyaz Alam
(74) *Attorney, Agent, or Firm* — C. Keith Montgomery

(57) ABSTRACT

A system and method for automating a deployment site served by a distributed antenna system (DAS) is disclosed. The deployment site is configured with a plurality of remote antenna units (RAU). At least one of the plurality of remote antenna units includes a first transceiver for uplinking and downlinking a signal of a cellular service and at least one second transceiver for uplinking a signal of at least one electrical element. Data from the at least one second transceiver received from an electrical element is collected and routed to an electrical element data collector configured to aggregate the collected data. Adjustments to and optimization of a device within the deployment site are based on the collected data.

23 Claims, 8 Drawing Sheets

(56) References Cited

U.S. PATENT DOCUMENTS

| | | |
|---|---|---|
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,297,225 A | 3/1994 | Snow et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,875,211 A | 2/1999 | Cooper |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |

(56) References Cited

U.S. PATENT DOCUMENTS

| | | |
|---|---|---|
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Martin et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B1 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,558 B2 | 7/2004 | Chiu et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,871,081 B1 | 3/2005 | Llewellyn et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,901,061 B1 | 5/2005 | Joo et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,931,813 B2 | 8/2005 | Collie |
| 6,933,849 B2 | 8/2005 | Sawyer |
| 6,934,511 B1 | 8/2005 | Lovinggood et al. |
| 6,934,541 B2 | 8/2005 | Miyatani |
| 6,939,222 B2 | 9/2005 | Grossjohann et al. |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |

(56) References Cited

U.S. PATENT DOCUMENTS

| | | |
|---|---|---|
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,254,330 B2 | 8/2007 | Pratt et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,495,560 B2 | 2/2009 | Easton et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,565,080 B2 | 7/2009 | Mickelsson et al. |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,672,591 B2 | 3/2010 | Soto et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,073,329 B2 | 12/2011 | Gao et al. |
| 8,082,353 B2 | 12/2011 | Huber et al. |
| 8,086,192 B2 | 12/2011 | Rofougaran et al. |
| 8,107,815 B2 | 1/2012 | Akasaka et al. |
| 8,135,102 B2 | 3/2012 | Wiwel et al. |
| 8,155,525 B2 | 4/2012 | Cox |
| 8,213,401 B2 | 7/2012 | Fischer et al. |
| 8,223,795 B2 | 7/2012 | Cox et al. |
| 8,228,849 B2 | 7/2012 | Trachewsky |
| 8,238,463 B1 | 8/2012 | Arslan et al. |
| 8,270,387 B2 | 9/2012 | Cannon et al. |
| 8,275,262 B2 | 9/2012 | Cui et al. |
| 8,280,250 B2 | 10/2012 | Brodsky et al. |
| 8,280,259 B2 | 10/2012 | George et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,351,792 B2 | 1/2013 | Zheng |
| 8,374,508 B2 | 2/2013 | Soto et al. |
| 8,391,256 B2 | 3/2013 | Beach |
| 8,422,883 B2 | 4/2013 | Yeh et al. |

(56) References Cited

U.S. PATENT DOCUMENTS

| | | |
|---|---|---|
| 8,428,510 B2 | 4/2013 | Stratford et al. |
| 8,452,178 B2 | 5/2013 | Gao et al. |
| 8,462,683 B2 | 6/2013 | Uyehara et al. |
| 8,472,409 B2 | 6/2013 | Sun et al. |
| 8,472,579 B2 | 6/2013 | Uyehara et al. |
| 8,488,966 B2 | 7/2013 | Zheng |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,548,330 B2 | 10/2013 | Berlin et al. |
| 8,626,245 B2 | 1/2014 | Zavadsky et al. |
| 8,639,121 B2 | 1/2014 | George et al. |
| 8,649,684 B2 | 2/2014 | Casterline et al. |
| 8,676,214 B2 | 3/2014 | Fischer et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,780,743 B2 | 7/2014 | Sombrutzki et al. |
| 8,792,933 B2 | 7/2014 | Chen |
| 8,831,428 B2 | 9/2014 | Kobyakov et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,929,288 B2 | 1/2015 | Stewart et al. |
| 9,107,086 B2 | 8/2015 | Leimeister et al. |
| 9,112,547 B2 | 8/2015 | Scheinert et al. |
| 9,240,835 B2 | 1/2016 | Berlin et al. |
| 9,306,682 B2 * | 4/2016 | Singh ............... H04B 17/12 |
| 9,525,488 B2 | 12/2016 | Beamon et al. |
| 9,673,904 B2 | 6/2017 | Palanisamy et al. |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045518 A1 | 4/2002 | Dalebout et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0061763 A1 | 5/2002 | Weissman |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0139064 A1 | 10/2002 | Norwood |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0126294 A1 | 7/2003 | Thorsteinson et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0240884 A1 | 12/2004 | Gumaste et al. |
| 2004/0258105 A1 | 12/2004 | Spathas et al. |
| 2004/0267971 A1 | 12/2004 | Seshadri |
| 2005/0013612 A1 | 1/2005 | Yap |
| 2005/0052287 A1 | 3/2005 | Whitesmith et al. |
| 2005/0058451 A1 | 3/2005 | Ross |
| 2005/0058455 A1 | 3/2005 | Aronson et al. |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083512 A1 | 4/2006 | Wake |

(56) References Cited

U.S. PATENT DOCUMENTS

| | | |
|---|---|---|
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0146755 A1 | 7/2006 | Pan et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280370 A1 | 12/2007 | Liu |
| 2007/0286599 A1 | 12/2007 | Sauer et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159744 A1 | 7/2008 | Soto et al. |
| 2008/0166094 A1 | 7/2008 | Bookbinder et al. |
| 2008/0191682 A1 | 8/2008 | Cook |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0260389 A1 | 10/2008 | Zheng |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0067363 A1 | 3/2009 | Ruiz et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0097855 A1 | 4/2009 | Thelen et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0014868 A1 | 1/2010 | McGlynn et al. |
| 2010/0027443 A1 | 2/2010 | LoGalbo et al. |
| 2010/0054746 A1 | 3/2010 | Logan |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0093391 A1 | 4/2010 | Saban et al. |
| 2010/0099451 A1 | 4/2010 | Saban et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |

(56) References Cited

U.S. PATENT DOCUMENTS

| | | |
|---|---|---|
| 2010/0148373 A1 | 6/2010 | Chandrasekaran |
| 2010/0150556 A1 | 6/2010 | Soto et al. |
| 2010/0156721 A1 | 6/2010 | Alamouti et al. |
| 2010/0158525 A1 | 6/2010 | Walter |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0208656 A1 | 8/2010 | Oh |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028161 A1 | 2/2011 | Larsen |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0083152 A1 | 4/2011 | Centore, III et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0116794 A1 | 5/2011 | George et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0158649 A1 | 6/2011 | Hari |
| 2011/0182230 A1 | 7/2011 | Ohm et al. |
| 2011/0194475 A1 | 8/2011 | Kim et al. |
| 2011/0200325 A1 | 8/2011 | Kobyakov et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0244914 A1 | 10/2011 | Venkatraman et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0274021 A1 | 11/2011 | He et al. |
| 2011/0281536 A1 | 11/2011 | Lee et al. |
| 2011/0312340 A1 | 12/2011 | Wu et al. |
| 2012/0069880 A1 | 3/2012 | Lemson et al. |
| 2012/0134673 A1 | 5/2012 | Palanisamy et al. |
| 2012/0177026 A1 | 7/2012 | Uyehara et al. |
| 2012/0196611 A1* | 8/2012 | Venkatraman ...... H04W 52/143 455/450 |
| 2012/0208581 A1 | 8/2012 | Ishida et al. |
| 2012/0230695 A1 | 9/2012 | O'Krafka et al. |
| 2012/0257893 A1 | 10/2012 | Boyd et al. |
| 2012/0281565 A1 | 11/2012 | Sauer |
| 2012/0294208 A1 | 11/2012 | Rofougaran et al. |
| 2012/0314665 A1 | 12/2012 | Ishida et al. |
| 2012/0321305 A1 | 12/2012 | George et al. |
| 2013/0012195 A1 | 1/2013 | Sabat, Jr. et al. |
| 2013/0053050 A1 | 2/2013 | Kang et al. |
| 2013/0077580 A1 | 3/2013 | Kang et al. |
| 2013/0089332 A1 | 4/2013 | Sauer et al. |
| 2013/0094439 A1 | 4/2013 | Moshfeghi |
| 2013/0095871 A1* | 4/2013 | Soriaga ............... H04B 7/0691 455/503 |
| 2013/0095873 A1 | 4/2013 | Soriaga et al. |
| 2013/0142054 A1 | 6/2013 | Ahmadi |
| 2013/0195467 A1 | 8/2013 | Schmid et al. |
| 2013/0210490 A1 | 8/2013 | Fischer et al. |
| 2013/0236180 A1 | 9/2013 | Kim et al. |
| 2013/0249292 A1 | 9/2013 | Blackwell, Jr. et al. |
| 2014/0016583 A1 | 1/2014 | Smith |
| 2014/0024402 A1* | 1/2014 | Singh ..................... H04B 17/23 455/501 |
| 2014/0072064 A1 | 3/2014 | Lemson et al. |
| 2014/0086082 A1 | 3/2014 | Kim et al. |
| 2014/0113671 A1 | 4/2014 | Schwengler |
| 2014/0118464 A1 | 5/2014 | George et al. |
| 2014/0119735 A1 | 5/2014 | Cune et al. |
| 2014/0140225 A1 | 5/2014 | Wala |
| 2014/0146692 A1 | 5/2014 | Hazani et al. |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0153919 A1 | 6/2014 | Casterline et al. |
| 2014/0162664 A1 | 6/2014 | Stapleton et al. |
| 2014/0194135 A1 | 7/2014 | Terry |
| 2014/0219140 A1* | 8/2014 | Uyehara ............... H04B 7/024 370/278 |
| 2014/0233435 A1 | 8/2014 | Ko |
| 2014/0243033 A1 | 8/2014 | Wala et al. |
| 2014/0274184 A1 | 9/2014 | Regan |
| 2015/0037041 A1 | 2/2015 | Cune et al. |
| 2015/0119079 A1* | 4/2015 | Tarlazzi ................. H04W 4/04 455/456.1 |
| 2016/0135184 A1* | 5/2016 | Zavadsky ............... H04B 7/04 370/329 |
| 2016/0174345 A1* | 6/2016 | Kelly ..................... G08C 17/02 315/131 |
| 2016/0270032 A1 | 9/2016 | Guevin |
| 2016/0309340 A1* | 10/2016 | Malach ................ H04L 5/001 |
| 2016/0365897 A1 | 12/2016 | Gross et al. |
| 2016/0366587 A1 | 12/2016 | Gross et al. |
| 2017/0047998 A1 | 2/2017 | Palanisamy et al. |
| 2017/0222691 A1 | 8/2017 | Gross et al. |
| 2017/0244507 A1 | 8/2017 | Hannan |
| 2017/0245162 A1 | 8/2017 | Beck et al. |
| 2017/0257833 A1 | 9/2017 | Hannan et al. |

FOREIGN PATENT DOCUMENTS

| | | |
|---|---|---|
| CA | 2065090 C | 2/1998 |
| CA | 2242707 A1 | 1/1999 |
| CN | 1207841 A | 2/1999 |
| CN | 1230311 A | 9/1999 |
| CN | 1980088 A | 6/2007 |
| CN | 101043276 A | 9/2007 |
| CN | 101340647 A | 1/2009 |
| CN | 101389147 A | 3/2009 |
| CN | 101389148 A | 3/2009 |
| CN | 101547447 A | 9/2009 |

(56) References Cited

FOREIGN PATENT DOCUMENTS

| | | |
|---|---|---|
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0899976 A2 | 3/1999 |
| EP | 0993124 A2 | 4/2000 |
| EP | 0994582 A1 | 4/2000 |
| EP | 1037411 A2 | 9/2000 |
| EP | 1089586 A2 | 4/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1916806 A1 | 4/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2319439 A | 5/1998 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 | 6/2004 |
| JP | 2004222297 A | 8/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0209363 A2 | 1/2002 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004034098 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2007133507 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 20090132824 A2 | 11/2009 |
| WO | 2010090999 A1 | 8/2010 |
| WO | 2010132739 A1 | 11/2010 |
| WO | 2011023592 A1 | 3/2011 |
| WO | 2011059705 A1 | 5/2011 |
| WO | 2011100095 A1 | 8/2011 |
| WO | 2011139939 A1 | 11/2011 |
| WO | 2011139942 A1 | 11/2011 |
| WO | 2011152831 A1 | 12/2011 |
| WO | 2012148938 A1 | 11/2012 |
| WO | 2012148940 A1 | 11/2012 |
| WO | 2013122915 A1 | 8/2013 |
| WO | 2017112807 A1 | 6/2017 |

OTHER PUBLICATIONS

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Duantum Electronics, Optical Society of America, May 2008, 2 pages.

Chrostowski, "Optical Injection Locking of Vertical Cavity Surface Emitting Lasers," Fall 2003, PhD dissertation Jniversity of California at Berkely, 122 pages.

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

(56) References Cited

OTHER PUBLICATIONS

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based Pmd Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Advisory Action for U.S. Appl. No. 12/712,758 dated Sep. 16, 2013, 3 pages.
Final Office Action for U.S. Appl. No. 12/712,758 dated May 24, 2013, 17 pages.
Non-final Office Action for U.S. Appl. No. 12/712,758 dated Jan. 10, 2012, 14 pages.
Examination Report for European patent application 07835803.3 dated Aug. 13, 2013, 6 pages.
Extended European Search Report for patent application 10014262.9 dated Mar. 14, 2011, 6 pages.
International Search Report and Written Opinion for PCT/US2012/034853 dated Aug. 6, 2012, 12 pages.
International Search Report and Written Opinion for PCT/US2012/034855 dated Jul. 26, 2012, 10 pages.
Written Opinion of the International Searching Authority for European patent application 11701916.6 dated Sep. 21, 2012, 10 pages.
International Search Report for PCT/US2011/021799 dated Apr. 6, 2011, 4 pages.
Examination Report for European patent application 10702806.0 dated Sep. 12, 2013, 11 pages.
Non-final Office Action for U.S. Appl. No. 13/194,429 dated Mar. 1, 2013, 22 pages.
Notice of Allowance for U.S. Appl. No. 13/194,429 dated Jul. 9, 2013, 9 pages.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband Mimo Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Examiner's Answer to the Appeal Brief for U.S. Appl. No. 12/712,758 mailed Jul. 7, 2014, 12 pages.
Notice of Allowance for U.S. Appl. No. 13/592,502 dated May 9, 2014, 9 pages.
International Search Report for PCT/US2011/034733 dated Aug. 1, 2011, 5 pages.
International Preliminary Report on Patentability for PCT/US2011/034733 dated Nov. 6, 2012, 7 pages.
Translation of the First Office Action for Chinese Patent Application No. 201180008168.1, dated Jun. 5, 2014, 9 pages.
Notification of First Office Action for Chinese Patent Application No. 201010557770.8, dated Jul. 3, 2014, 14 pages.
Non-final Office Action for U.S. Appl. No. 12/618,613 dated Dec. 29, 2011, 10 pages.
Non-final Office Action for U.S. Appl. No. 12/618,613 dated Jul. 5, 2012, 9 pages.
Translation of the First Office Action for Chinese Patent Application No. 201080055264.7, dated Jun. 5, 2014, 6 pages.
Extended European Search Report for European patent application 12777604.5 dated Oct. 1, 2014, 7 pages.
Extended European Search Report for European patent application 12776915.6 dated Oct. 13, 2014, 7 pages.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Notice of Reexamination for Chinese patent application 20078002293.6 dated Nov. 28, 2014, 22 pages.
Examination Report for European patent application 10702806.0 dated Nov. 14, 2014, 7 pages.
Decision on Appeal for U.S. Appl. No. 11/406,976, dated Nov. 3, 2014, 6 pages.
Non-final Office Action for U.S. Appl. No. 13/688,448 dated Dec. 29, 2014, 16 pages.
Non-final Office Action for U.S. Appl. No. 14/063,245 dated Jan. 26, 2015, 22 pages.
Toycan, M. et al., "Optical network architecture for UWB range extension beyond a single complex of cells," Presented at the 33rd European Conference and Exhibition of Optical Communication, Sep. 16-20, 2007, Berlin, Germany, VDE, 2 pages.
Notice of Second Office Action for Chinese Patent Application No. 201010557770.8, dated Mar. 10, 2015, 13 pages.
Official Communication from the European Patent Office for 10779113.9, dated Jun. 20, 2012, 2 pages.
International Search Report for PCT/US2007/011034, dated Apr. 3, 2008, 2 pages.
International Preliminary Report on Patentability for PCT/US2007/011034, dated Nov. 11, 2008, 8 pages.
International Search Report for PCT/US2013/037090, dated Jul. 22, 2013, 4 pages.
Non-Final Office Action for U.S. Appl. No. 11/430,113, dated Apr. 10, 2008, 6 pages.
Notice of Allowance for U.S. Appl. No. 11/430,113, dated Dec. 8, 2008, 9 pages.
Non-Final Office Action for U.S. Appl. No. 13/595,099, dated Jun. 20, 2013, 9 pages.
Notice of Allowance for U.S. Appl. No. 13/915,882, dated Apr. 10, 2015, 12 pages.
Final Office Action for U.S. Appl. No. 14/063,245, dated Apr. 16, 2015, 24 pages.
Advisory Action for U.S. Appl. No. 14/063,245, dated Jun. 8, 2015, 3 pages.
Non-Final Office Action for U.S. Appl. No. 14/146,949, dated Dec. 3, 2014, 14 pages.
Non-Final Office Action for U.S. Appl. No. 14/146,949, dated Apr. 14, 2015, 16 pages.
Author Unknown, "The I2C-Bus Specification," Version 2.1, Jan. 2000, Philips Semiconductors, 46 pages.
Notice of Third Office Action for Chinese Patent Application 201010557770.8 dated Sep. 23, 2015, 15 pages.
International Search Report for PCT/US2010/054234, dated Feb. 28, 2011, 4 pages.
Notice of Allowance for U.S. Appl. No. 14/062,289, dated Jul. 8, 2015, 9 pages.
Non-final Office Action for U.S. Appl. No. 14/063,630 dated Jul. 10, 2015, 19 pages.
Non-final Office Action for U.S. Appl. No. 14/172,240 dated Jun. 5, 2015, 14 pages.
Final Office Action for U.S. Appl. No. 14/172,240 dated Oct. 9, 2015, 23 pages.
Non-final Office Action for U.S. Appl. No. 14/465,565 dated Jun. 26, 2015, 15 pages.
Decision on Rejection for Chinese Patent Application No. 201010557770.8, dated Jan. 27, 2016, 16 pages.
Translation of the First Office Action for Chinese Patent Application No. 201280024385.4, dated Jan. 28, 2016, 6 pages.
Notice of Allowance for U.S. Appl. No. 14/465,565, dated Dec. 11, 2015, 8 pages.
Non-final Office Action for U.S. Appl. No. 14/063,630, dated Dec. 14, 2015, 17 pages.
Advisory Action for U.S. Appl. No. 14/172,240 dated Dec. 30, 2015, 3 pages.
Non-final Office Action for U.S. Appl. No. 14/518,574, dated Jan. 6, 2016, 16 pages.

(56) References Cited

OTHER PUBLICATIONS

Non-final Office Action for U.S. Appl. No. 14/493,966, dated Jan. 15, 2016, 12 pages.
Notice of Allowance for U.S. Appl. No. 14/936,007 dated Feb. 22, 2016, 9 pages.
Decision on Appeal for U.S. Appl. No. 12/712,758 dated Jun. 27, 2016, 15 pages.
Final Office Action for U.S. Appl. No. 14/063,630, dated May 12, 2016, 18 pages.
Examiner's Answer to the Appeal Brief for U.S. Appl. No. 14/172,240 dated Jul. 1, 2016, 34 pages.
Final Office Acttion for U.S. Appl. No. 14/518,574, dated May 12, 2016, 24 pages.
Final Office Action for U.S. Appl. No. 14/493,966, dated Jun. 2, 2016, 11 pages.
Non-final Office Action for U.S. Appl. No. 14/966,243 dated Jan. 25, 2016, 16 pages.
Notice of Allowance for U.S. Appl. No. 14/966,243 dated Jun. 21, 2016, 8 pages.
Translation of the First Office Action for Chinese Patent Application No. 201280028800.3, dated Jul. 22, 2016, 8 pages.
International Search Report for PCT/IL2016/050368, dated Aug. 9, 2016, 7 pages.
Notice of Allowance for U.S. Appl. No. 14/063,630, dated Jul. 29, 2016, 9 pages.
Non-final Office Action for U.S. Appl. No. 14/518,574, dated Aug. 11, 2016, 13 pages.
Final Office Action for U.S. Appl. No. 14/518,574, dated Dec. 29, 2016, 18 pages.
Non-Final Office Action for U.S. Appl. No. 14/687,423, dated Oct. 14, 2016, 9 pages.
Non-final Office Action for U.S. Appl. No. 14/822,991, dated Sep. 23, 2016, 5 pages.
Non-Final Office Action for U.S. Appl. No. 14/862,635, dated Nov. 16, 2016, 18 pages.
Non-Final Office Action for U.S. Appl. No. 15/283,974, dated Nov. 2, 2016, 42 pages.
Author Unknown, "Fiber Optic Distributed Antenna System," Installation and Users Guide, ERAU Version 1.5, May 2002, Andrews Corporation, 53 pages.
Notice of Reexamination for Chinese Patent Application No. 201010557770.8, dated Dec. 21, 2016, 22 pages.
Examination Report for European Patent Application No. 11701916.6, dated Jan. 5, 2017, 6 pages.
Advisory Action for U.S. Appl. No. 14/518,574, dated Mar. 22, 2017, 3 pages.
Notice of Allowance for U.S. Appl. No. 14/687,423, dated Apr. 12, 2017, 7 pages.
Notice of Allowance for U.S. Appl. No. 14/822,991, dated Feb. 8, 2017, 11 pages.
Notice of Allowance for U.S. Appl. No. 14/862,635, dated May 24, 2017, 7 pages.
Non-Final Office Action for U.S. Appl. No. 15/179,128, dated Jan. 13, 2017, 7 pages.
Notice of Allowance for U.S. Appl. No. 15/179,128, dated Jun. 9, 2017, 10 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems characteristics—Optical Fibre Cables, Characteristics of a Bending Loss Insensitive Single Mode Optical Fibre and Cable for the Access Network," ITU-T Recommendation G.657, International Telecommunication Union, 20 pages.
Author Unknown, RFID Technology Overview, Date Unknown, 11 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

(56) References Cited

OTHER PUBLICATIONS

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Second Office Action for Chinese patent application 20078002293.6 dated Aug. 30, 2012, 10 pages.
International Search Report for PCT/US2010/022847 dated Jul. 12, 2010, 3 pages.
International Search Report for PCT/US2010/022857 dated Jun. 18, 2010, 3 pages.
Decision on Appeal for U.S. Appl. No. 11/451,237 dated Mar. 19, 2013, 7 pages.
Decision on Rejection for Chinese patent application 200780022093.6 dated Feb. 5, 2013, 9 pages.
International Search Report and Written Opinion for International patent application PCT/US2007/013802 dated May 3, 2008, 12 pages.
Decision on Appeal for U.S. Appl. No. 14/172,240, dated Dec. 27, 2017, 9 pages.
Notice of Allowance for U.S. Appl. No. 15/585,356, dated Oct. 12, 2017, 10 pages.
Non-Final Office Action for U.S. Appl. No. 15/795,693, dated Nov. 29, 2017, 19 pages.
Non-Final Office Action for U.S. Appl. No. 15/590,216, dated Oct. 25, 2017, 12 pages.

\* cited by examiner

IOT AUTOMATION AND DATA COLLECTION SYSTEM

CROSS-REFERENCE TO RELATED APPLICATION

This application claims the benefit of priority under 35 U.S.C. § 119 of U.S. Provisional Application Ser. No. 62/193,642 filed Jul. 17, 2015, the content of which is relied upon and incorporated herein by reference in its entirety.

BACKGROUND

The disclosure relates generally to a wireless distribution system (WDS) and more particularly to techniques for Internet of Things (TOT) automation.

Wireless communication is rapidly growing, with ever-increasing demands for high-speed mobile voice communication. Wireless distribution systems are used extensively to extend the reach of base stations of cellular service providers. One example of a wireless distribution system is a distributed antenna system (DAS). DASs are particularly useful for deployment inside buildings or other indoor environments where client devices may not otherwise be able to effectively receive radio-frequency (RF) signals from a source, such as a base station, for example. They may be used for both voice and data applications. Illustrative applications for distributed antenna systems to provide or enhance coverage for wireless services include public safety, cellular telephony, local access network (LANs), wireless local access networks (wireless LANs), location tracking and medical telemetry inside buildings and over campuses.

Distributed antenna systems may also be used for other radio-based communications services. As an example, local area wireless services (e.g., so-called "wireless fidelity" or "Wi-Fi" systems) and wide area wireless services are being deployed in many different types of areas and large venues, e.g., coffee shops, airports, libraries, stadiums, office buildings and the like. Wireless distribution systems (WDSs) communicate with wireless devices called "clients," "client devices," "wireless client devices," or "wired client devices," or more generally, electrical elements which reside within a deployment site of the WDS, that is within the range or WDS or "cell coverage area" provided by the WDS.

The manner in which a distributed antenna system provides or enhances coverage is through a plurality of spatially separated antennas, sometimes known as remote antenna units (RAUs). The distributed antenna system communicates with a variety of commercial communications systems to distribute their services, especially voice and data communications, to clients within range of the distributed antenna system.

In so doing, the distributed antenna system provides a physical layer or infrastructure for delivering signals from a base station or other radio transceiver to/from a user equipment of an end user. For example, the WDS may be installed within a building to provide wireless connectivity to clients within the building.

Many buildings are also provided with building automation systems (BAS) to monitor and control heating, ventilation, and air conditioning (HVAC) systems, manage building facilities (e.g., lighting, safety, and security), and automate meter reading, as examples.

More recently, the technology of wireless sensor networks has been attracting extensive research and development efforts to replace the traditional wired solutions for building automation systems. One challenge in using wireless sensors for building automation is the need to guarantee adequate radio links between the sensors and a central controller, while maintaining low battery power consumption. In many types of buildings, this is a significant challenge due to sire of these building and the obstructions for radio frequency (RF) propagation, such as thick walls, elevator shafts, metal sheets etc. Another challenge is supporting different protocols of the different sensor devices, such as Blue Tooth Low Energy (BLE), ZigBee™, SigFox, Zwave, Thread, and the like. Often, these protocols may need to be converted into one standard protocol (IP based) in order to be recognized and transferred all the way to application/data servers to be analyzed.

What is needed is a way to connecting devices and systems from within and without a deployment site with greater precision, adaptability, scalability, security, and in a way that is easier to maintain and update. Deployment sites need an architecture that is flexible enough to evolve and adapt to the needs of today and tomorrow. This need includes a way to monitor conditions within a deployment site of a distributed antenna system and to control systems, based on the monitored conditions, such as heating, ventilation and air conditioning (HVAC), lighting, safety, security, and utility meter reading, smart home related peripherals, as well as devices within such systems or other devices within the distributed antenna system. In addition, there may be a need to monitor movement and behavior of people within the premise/building. There may also be a need for the ability to analyze and predict future events, and a way to optimize organizational processes.

SUMMARY

Technologies are described for using the capabilities of a wireless distribution system (WDS) and a distributed antenna system (DAS) that implements the WDS.

One embodiment of this disclosure relates to a system for managing communication over a network. The system includes a distributed antenna system (DAS) for receiving at least one cellular service from at least one base station The distributed antenna system (DAS) includes a head end unit (HEU) and a plurality of remote antenna units (RAU). The plurality of remote antenna units (RAU) are distributed over the deployment site and the head end unit (HEU) is configured for routing the at least one cellular service to the plurality of remote antenna units (RAU). At least one of the plurality of remote antenna units includes a first transceiver configured for uplinking and downlinking a signal of a cellular service and at least one second transceiver configured for uplinking (and, in some illustrative embodiments, downlinking) a signal of at least one electrical element. An electrical element at or about the deployment site is configured to generate an electrical signal periodically, and/or on the occurrence of an event and to transmit the generated signal to the at least one second transceiver. The system also includes a router/gateway configured for connecting to the at least one of the plurality of remote antenna units. The router/gateway is configured for routing data from the at least one second transceiver received from the electrical element. The router/gateway may also be configured to convert converting a protocol used by the at least one electrical element to a standard/common protocol, in one embodiment. The router/gateway may also be configured to provide security measures against unwanted access to the at least one electrical element, in one embodiment. An automation controller is configured to determine adjustments to the automation system based on the received electrical element data or on demand.

An additional embodiment of the disclosure relates to a method for monitoring and optimizing a network. The method is for automating a site served by a distributed antenna system (DAS) for receiving at least one service from at least one base station. The distributed antenna system (DAS) includes a head end unit (HEU) and a plurality of remote antenna units (RAU). The plurality of remote antenna units (RAU) are distributed over the site. The head end unit (HEU) is configured for routing the at least one service to the plurality of remote antenna units (RAU). The method includes configuring the site with a plurality of remote antenna units (RAU), at least one of the plurality of remote antenna units comprising a first transceiver for uplinking and downlinking a signal of a cellular service and at least one second transceiver for uplinking (and, in some illustrative embodiments, downlinking) a signal of at least one electrical element and also includes collecting data from the at least one second transceiver received from an electrical element. The method also includes routing the collected data to an electrical element data collector configured to aggregate the collected data, determining adjustments to a device within the site based on the collected data and optimizing the device based on the collected data.

Another embodiment of the disclosure relates to a method for automating a deployment site served by a distributed antenna system (DAS) for receiving at least one service from at least one base station. The distributed antenna system (DAS) includes a head end unit (HEU) and a plurality of remote antenna units (RAU). The plurality of remote antenna units (RAU) are distributed over the deployment site. The head end unit (HEU) is configured for routing the at least one service to the plurality of remote antenna units (RAU). The method includes configuring the deployment site with a plurality of remote antenna units (RAU), at least one of the plurality of remote antenna units being configured with a first transceiver for uplinking and downlinking a signal of a cellular service and with at least one second transceiver for uplinking (and, in some illustrative embodiments, downlinking) a signal of at least one electrical element and also includes collecting data from the at least one second transceiver received from an electrical element. The method may also include converting a protocol used by the at least one electrical element to a standard/common protocol, in one embodiment, if needed. The method also includes routing the collected data to an electrical element data collector configured to aggregate the collected data, determining adjustments to a remote device connected to the at least one electrical element based on the aggregated data and adjusting the remote device based on the aggregated data. In one embodiment, the method may also include storing and analyzing the data from the electrical device using machine learning, deep learning, and AI algorithms for optimizations, statistics gathering, and making relevant predictions for things such as power failures, machinery failures, earthquakes, etc.

The foregoing automation system and method enable a distributed antenna system (DAS) to illustratively provide an Internet of Things (IoT) hub. Illustratively, the remote antenna unit (RAU) of the distributed antenna system (DAS) may provide the Internet of Things (IoT) hub with the head end unit (HEU) providing a gateway to the Internet that receives data from the remote antenna units (RAUs) from within a deployment site and stores the data in a database for access from without the distributed antenna system (DAS) by a public or private network over the Internet. In this illustrative example, the head end unit (HEU) also functions as an IP translator that may (1) receive data from the remote antenna unit (RAU) communicated in any of a number of protocol formats (e.g., Blue Tooth Low Energy (BLE), Z-WAVE, Thread, ZigBee™, Wi-Fi, and long range related protocols (LoRa) connection such as SIGFOX; as well as bi-directional protocols, such as WiFi), (2) extract that data from such protocol(s), (3) store the extracted data in a database for access from without the distributed antenna system (DAS) over the Internet in response to a data access request, (4) and in response to a data access request over the Internet from outside the distributed antenna system (DAS), package the data from the database into data packages according to the IP protocol or other internet protocol for transmission over the Internet. Of course, the head end unit (HEU) may also package the data into data packages for transmission according to protocols other than the IP protocol or other Internet protocol in response to any request for data made from outside the distributed antenna system (DAS) over any private or public network.

In applying the Internet of Things (IoT) teachings of this disclosure in the realm of facilities management, person tracking, and employee location data gathering the automation system and data collection systems, and associated methods of this disclosure may be configured for performing optimization activities within a building, as well as for performing statistical and analytical operations on data. For example, predictive maintenance of systems in a building can be performed. Other high level applications may involve tracking of people (employees, visitors, shoppers, etc.) and data on crowds, such as the whereabouts, movement, and location, as well as related behaviors. This data may be stored and analyzed as part of what is known today as data analytics, which can provide statistics and insights on behavior, preferences, and predictions, using techniques such as pattern recognition and machine learning.

In any teachings, this disclosure finds application in distributed antenna systems (DAS) comprising a fiber optic, coax, hybrid fiber coax, and other wired or wireless implementations.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely illustrative, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
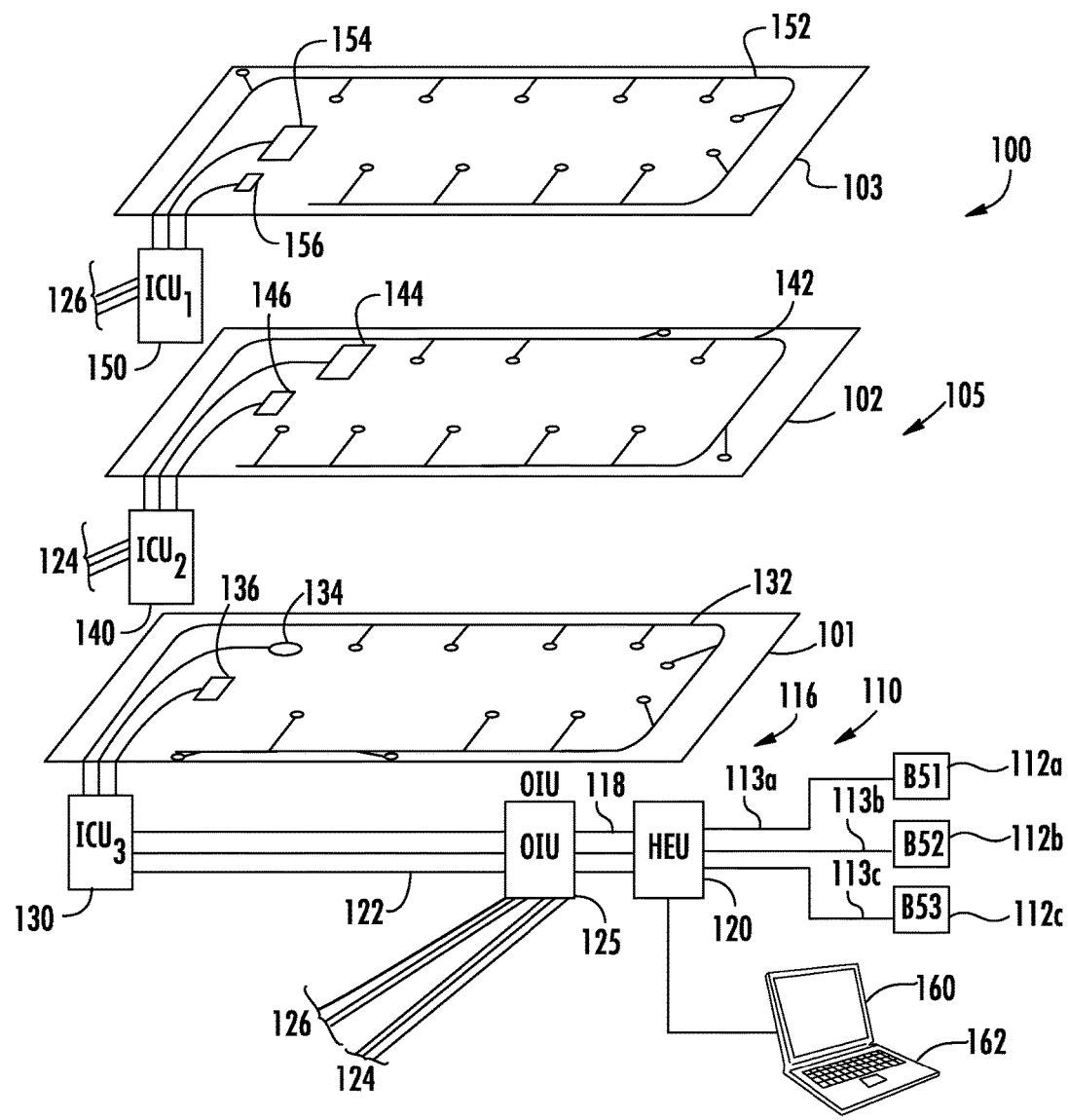
FIG. 1 depicts a schematic diagram of an illustrative communications system of the prior art configured to distribute communications signals within an installation, such as a building.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Broadly speaking, a system and method for automating a deployment site served by a distributed antenna system (DAS), and gathering data at the deployment site, is disclosed. The deployment site is configured with a plurality of remote antenna units (RAU). At least one of the plurality of remote antenna units includes a first transceiver for uplinking and downlinking a signal of a cellular service and at least one second transceiver for uplinking and downlinking a signal of at least one electrical element. Data from the at least one second transceiver received from an electrical element (such as a wireless sensor (WS), in one embodiment) is collected and routed to an electrical element data collector configured to aggregate the collected data. Adjustments to and optimization of a device within the deployment site are based on the collected data. Same addition here . . .

More specifically, technologies are described herein for systems and methods to configure a distributed antenna system (DAS) having a plurality of remote antenna units for communication with electrical elements, as herein described, served by the distributed antenna system or in the coverage area of the DAS. The distributed antenna system may serve a specific area or site, such as a portion of a large building, a building or a site, or even a group of co-located buildings. A method and system for improving and optimizing communication and control according to this disclosure may include configuring a remote antenna unit with a first transceiver for uplinking and downlinking a signal of a cellular service and with at least one second transceiver for uplinking (and in some cases, downlinking) a signal from electrical elements in the area served by the particular remote antenna unit. The electrical elements may be configured for one-way or two-way devices, using Bluetooth™, Bluetooth Low Energy™ ("BLE"), Wi-Fi, ZigBee™ as well as a variety of other technologies that utilize other frequency bands may be used, such as the sub-GHz range like Z-WAVE, long-range (LoRa) frequencies such as SIGFOX, Thread and so forth.

Data from the electrical elements are collected by the IoT automation system of this disclosure and routed to a data collector configured to store the collected data. In one illustrative embodiment, an IoT automation controller executes instructions based on the collected data for controlling building systems, based on the monitored conditions, such as heating, ventilation and air conditioning (HVAC), lighting, safety, security, and utility meter reading, as well as devices within such systems or other devices within the wireless distribution system In describing more fully this disclosure, we make reference to the following definitions:

By the term "communication service" is meant digital data services including but not limited to Wi-Fi, Bluetooth, Z-Wave, ZigBee™, SigFox, Lora, Thread, Ethernet, DSL, LTE, Wireless Access Points (WAPs), PCS, 2G, 3G, 4G, DSL (Digital Subscriber Line), Long Term Evolution (LTE), Remote Radio Heads (RRH), Radio over Fiber Optic Cable (RoF), OCS band, WiMax (Worldwide Interoperability for Microwave Access), LAN, CDMA, TDMA, GSM, WDM, Satellite radio, RFID, NFC, Wi-Gig and WLAN.

By the term "distributed antenna system" or DAS is meant an antenna system that includes a plurality of spatially separated antennas. The DAS may communicate with a variety of commercial communications systems to distribute the services to clients within range of the distributed antenna system. The distributed antenna system may be an optical fiber-based distributed antenna system, but such is not required, and these systems may include both optical fibers and standard wired communications cables, such as those with copper conductors. It will be appreciated that the distributed antenna system may be a wire-based or a wireless system.

By the term "head end unit (HEU)" is meant a plurality of radio distribution/combiner (RDCs) and a switching matrix for combining a plurality of communications signals into a broad band signal for further transmission, such as, but not limited to, transmission to an optical interface unit, and for splitting a broadband signal from an optical interface unit into individual communication signals By the term "remote antenna unit (RAU)" or remote unit ("RU") is meant a device connected to an optical Interface module, or to a coax cable, that converts and filters a broadband optical signal into a narrow electrical signal and vice versa. The RAU provides the wireless access front end.

By the term "electrical element" is meant the term electrical element as described in connection with FIGS. 3A, 3B, 4. These electrical elements may be devices that include one or more sensors. These devices may include user equipment, such as cell phones or smart phones. The devices may also include devices, such as equipment, sensors, or both in the served area. For example, the equipment and sensors may include heating and ventilating facilities, security apparatuses, utility meters, detectors for motion and or proximity and the like.

By the term "clients or recipients of these services" is meant devices such as cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of client devices. More generally, a client is computer hardware or software that accesses a service made available by a server.

By the term "sensor" is meant a device that is in contact with an environment and that generates an electrical signal on detection of some quantity or condition of the environment. Examples may include accelerometers, temperature elements such as thermistors and thermocouples, pressure-sensing devices, and the like. These devices may sense and report on a temperature, a pressure, an atmospheric component such as an $O_2$, CO or $CO_2$ percentage, and the like. Sensors may also include meters, e.g., utility consumption meters such as a water meter, an electrical meter, a gas meter and the like. Sensors may also include motion sensors for detecting expected or unexpected movement, microphones for detecting expected or unexpected sound or noise, or the intensity or duration of the sound or noise. Video sensors, such as cameras, charge-coupled devices and the like can be used to detect expected or unexpected movement, presence and the like. Sensors or electrical elements may also include global positioning sensors (GPS), a compass or gyro, a power meter, proximity sensors and so forth.

Turning now to the drawings, FIG. 1 depicts an example of a distributed antenna system (DAS) 100 for a first 101, a second 102 and a third 103 floor, respectively, of a building 105. In this example a plurality of communications services 110 are provided, such communications coming from first, second and third base stations 112a, 112b 112c over cables 113a, 113b, 113c respectively, from service providers. The services are input to a head end unit (HEU) 120 for routing through distributed antenna system 100. The distributed antenna system 100 is controlled by a computer 160 with operator input device 162. The computer may include local memory and may have access to remote memory, as well as computer programs stored on at least one non-transitory medium, either locally or remotely. The computer 160 may be connected directly to the head end unit 120 and may be in control of other elements of the distributed antenna system via wired connections or remotely, as shown. The computer system may also control an optical interface unit 125.

The communication services are illustratively routed through distributed antenna system 100 as shown in FIG. 1. Cable or hard wire outputs 118 from the head end unit 120 may connect to the optical interface unit 125 and then to interconnect units 130, 140, 150 for serving the first, second and third floors 101, 102, 103 of building 105. Interconnect units 130, 140, 150 provide mechanical interfaces and power to the cable outputs from the interconnect units.

The computer 160 may be used to control the head end unit, the optical interface unit and the interconnect units of the system. The computer may also control or monitor switches and switch matrices of the head end unit and optical interface unit useful in operation of distributed antenna systems. The computer may be supplied with a non-transitory memory and a computer program useful for routing the signals through the system. Within each floor, the services are then provided separately, as shown. Thus, the first floor 101 may be provided, through its interconnect unit 130, with an Ethernet wire distribution 132, a Wi-Fi hot spot 134, and a telecommunications antenna 136. In this example, similar services may be provided to the second and third floors 102, 103, through their interconnect units 140, 150 with Ethernet lines 142, 152, Wi-Fi hot spots 144, 154 and telecommunications antennas 146, 156. The Wi-Fi hot spot and/or telecommunications antenna may be provided by a remote antenna unit which may include an RF transmitter/receiver (not shown) and a respective antenna (not shown) operably connected to the RF transmitter/receiver to wirelessly distribute the communications services to user equipment (not shown). Examples of user equipment include a cellular phone, a smart phone, or other device, such as a tablet or a personal digital assistant.

Figure 2:
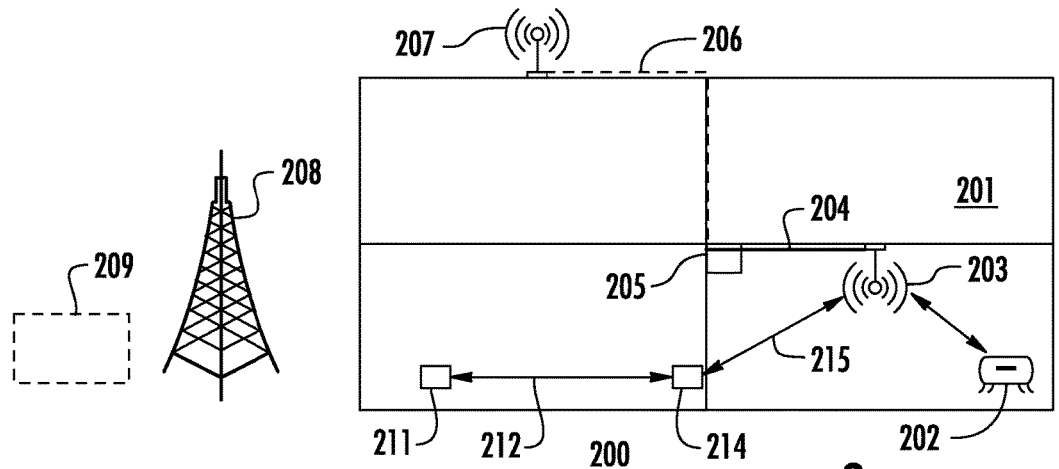
FIG. 2 depicts a prior art building automation system.

FIG. 2 depicts an example of a prior art building automation system 200. The building automation system includes a transceiver 203 inside building 201 for picking up wireless signals from an air conditioner, heating unit, or other equipment 202 in the building 200. The wireless signal is transmitted over wire 204 to controller 205 which determines whether adjustments need to be made to the equipment 202 depending on the data in the received wireless signal, Alternatively or additionally, controller 205 may also communicate via wire 206, transceiver 207, and base station 208 with a remote controller 209 to allow control of equipment 202 from a remote location based on data received from the equipment 205.

FIG. 2 further shows devices 211 and 214 within building 201 which are also communicating with transceiver 203 for purposes of monitoring or controlling of devices 211 and 214 by controller 205. As shown, device 214 is in direct communication with transceiver 203 via communication link 215. Device 211, however, is only able to communicate with transceiver 203 indirectly through device 214 since it is outside the coverage area of the transceiver 203. The additional power requirements on device 214 due to the relaying of messages from device 211 puts a drain on the power source of device 214.

Having thus provided an overview of a wireless distribution system, we now turn to features provided by this disclosure. Broadly speaking, a method and system for an automation and data gathering system for a deployment site, such as a building, may include configuring a remote antenna unit of a distributed antenna system (DAS) deployed at the deployment site with a first transceiver for uplinking and downlinking a signal of a cellular service and with at least one second transceiver for uplinking and downlinking of a signal of non-cellular service such as Bluetooth, Wi-Fi, Z-WAVE, SigFox, Thread or ZigBee™ service from one or more electrical elements. Data is collected from at least one electrical element configured for connecting to the remote antenna unit. The collected data is routed to an IoT automation controller configured to determine adjustments to the automation system based on the received electrical element data or on demand. In another embodiment, the collected data may be sent to a data storage, to be used at a later time for data analytics operations. The collected data may be stored in an electrical element data collector which may be located in a database in the head-end unit or elsewhere within or outside the distributed antenna system (DAS) as explained below. The head end unit (HEU) provides a gateway to and from this database to allow access to this data by a public or private network over the Internet or in other ways as explained below.

The data collected from an electrical element may relate to any measurable parameter in the building that may be monitored for activity, conditions or any kind of performance. For example, the gathered data may concern utility consumption, e.g., the rate of usage of electricity, gas or water. The daily or hourly rate of utility usage may be compared with recent or historical usage, or with consumption limits, to track the consumption of the utility at the site or building in question. The gathered data may concern motion that is detected during off-hours or during business hours. The data may be used to detect intrusion into a deployment site, such as a building or a portion of a building or other site. As discussed below, the electrical element may include a sensor for providing data on temperature, pressure, atmospheric content or other physical variable. The data from the sensor may be used by the automation system of this disclosure to gauge the health or safety of the site. The gathered data may also concern data on an appliance in the IoT automation system. The IoT automation system of this disclosure, may be monitored and optimized based on the gathered data.

Alternatively, the data may be stored and/or accessed from outside the distributed antenna system (DAS) as explained herein for use in similar or other analytics, data recording, generation of historical data, archival, administrative, or other purposes.

More specifically, the remote antenna units of this disclosure are configured with a first transceiver for providing a connection to a cellular service for providing cellular service to the site. The distributed antenna system and the remote antenna units are also provided with a second (or more) transceiver for providing a connection to a second service for communication with one or more electrical elements as described herein. The second service may be a Blue Tooth Low Energy (BLE), Z-WAVE, ZigBee™, Thread, Wi-Fi, and long range related protocols (LORA) connection such as SIGFOX.

Figure 3A:
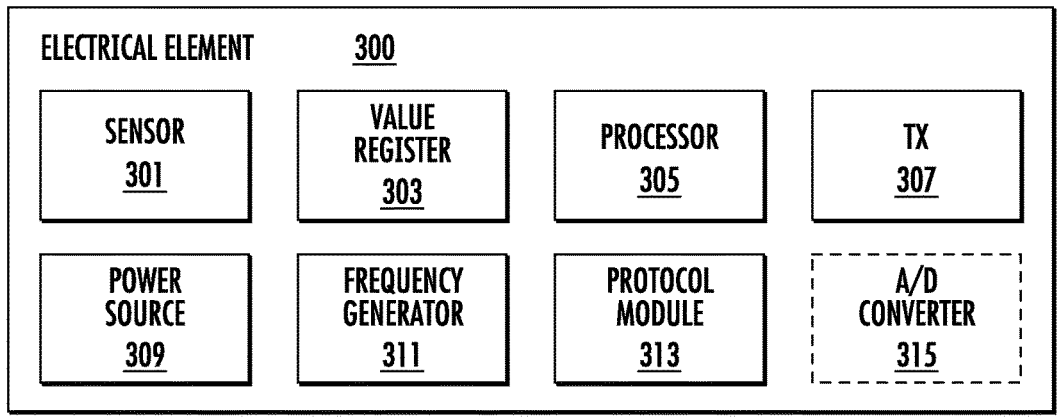
FIG. 3A depicts a first embodiment of an electrical element of the IoT automation system of the present disclosure.
Figure 3B:
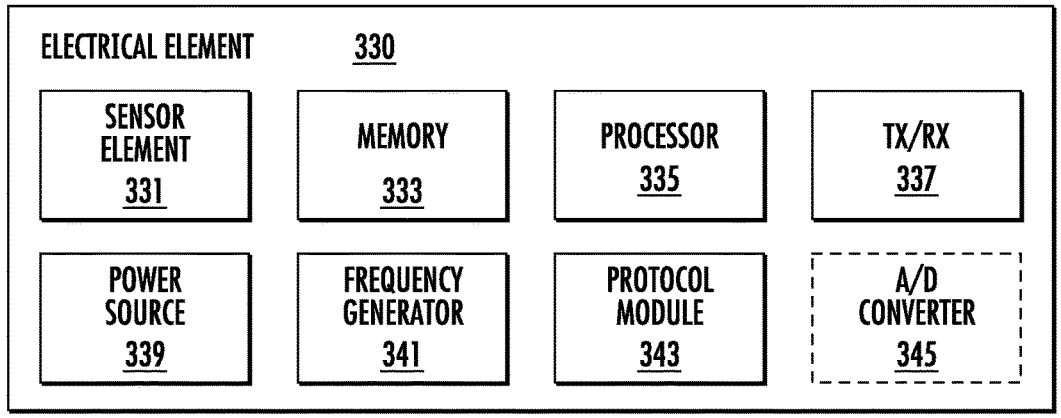
FIG. 3B depicts a second embodiment of an electrical element of the IoT automation system of the present disclosure.
Figure 3C:
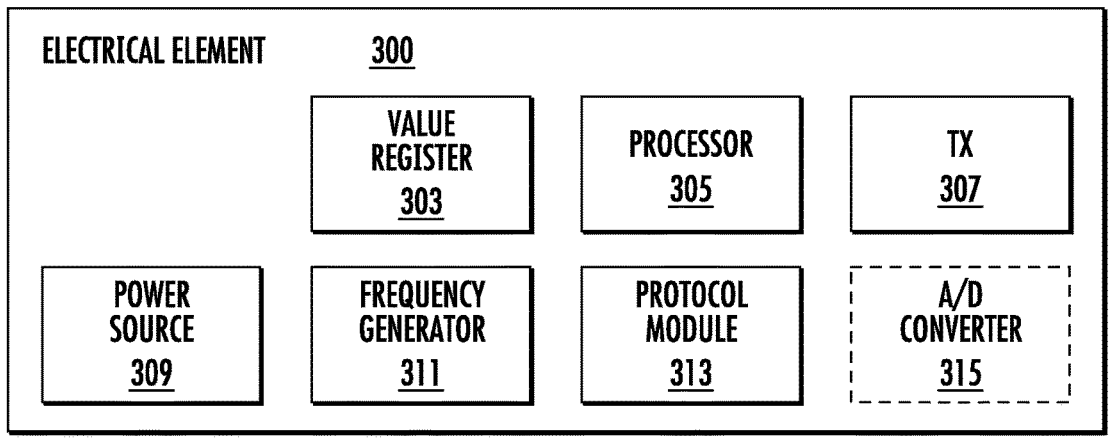
FIG. 3C depicts a third embodiment of an electrical element of the IoT automation system of the present disclosure.

FIGS. 3A, 3B, 3C depict illustrative electrical elements of this disclosure. FIGS. 3A and 3B illustrate electrical elements including a sensor. In other cases, as depicted in 3C, the electrical element need not include a sensor. For example, many appliances, with which the Internet of Things (IoT) automation system of this disclosure may be used, need not include a sensor. Examples of such electrical elements may be household devices, such as a washing machine, toaster oven, dish washer, copying machine, or any other device, that is equipped with a communication ability, and that have its protocol supported by the IoT automation system of this disclosure.

Turning more specifically to the drawings of FIGS. 3A, 3B, 3C; FIG. 3A depicts an electrical element according to this disclosure. Electrical element 300 includes a sensor 301, a value register 303, a processor 305, and in this embodiment, a radio transmitter 307. Electrical element 300 further includes a power source 309, a frequency generator 311, and a protocol module 313. Electrical element may optionally also include an analog to digital converter 315.

The sensor 301 may be any sensor or detector for sensing a condition within the deployment site of the wireless distribution system, the distributed antenna system or the particular remote antenna unit that serves the sensor element 301. Sensor 301 may be a temperature element for sensing temperature, an element for sensing humidity, a motion detector for sensing motion or presence in area, and so forth.

Sensor 301 generally operates in the following manner. The sensor 301 is configured to contact an environment and generate an electrical signal on detection of some quantity or condition of the environment. For example, a temperature sensor would generate an electrical signal on detection of a temperature change. A humidity sensor would generate an electrical signal on detection of humidity level change. The sensor may be a strain gauge which would generate an electrical signal on detection of a pressure or a movement of the sensor. The sensor may be a global positioning sensor which would generate an electrical signal based on the calculation of its geo-position with respect to one or more satellites. Other sensors may be used with this disclosure to generate an electrical signal on detection of other physical properties or conditions at the deployment site. Sensors may include consumption meters for monitoring on-site consumption of utilities, motion detectors, smoke detectors, cameras, proximity sensors, $O_2$ sensors, CO (carbon monoxide) sensors, $CO_2$ (carbon dioxide) sensors, sound detectors and the like.

The value register 303 may be a memory or other storage for storing the electrical signal representation of the value of a condition or property generated by the sensor. If the output from sensor 301 is the simple change of the electrical output of the sensor, that change in state would be stored in the value register which may be a flip flop or other register, in this example. If the electrical output of the sensor is either a multi-bit digital representation or an analog signal from sensor 301 that is converted into a digital signal by AID converter 315, the value register 303 may be a conventional memory device.

The processor 305 may be a microprocessor, a microcontroller, or the like. The processor is supported by memory (not shown) with instructions for controlling the transmitter 307, the protocol module 313, and one or more of the other components of the electrical element 300.

The radio transmitter 307 may be a one-way radio transmitter suitable for transmitting a radio signal indicative of the value of the element sensed by the sensor element. Alternatively, and as illustrated in FIG. 3B, the radio transmitter may be a transceiver capable of two-way communication with the remote antenna unit. The transmitter is adapted to transmit on one or more frequencies or frequency bands as required by the transmission protocol as discussed below.

The radio frequencies of the carrier and modulated signals that are transmitted by the electrical element are generated by the frequency generator 311. The frequency generator thus provides the carrier frequency of the channels or frequency bands in addition to the frequency of the modulated signal of data that is carried by the carrier frequency. For the embodiment illustrated in FIG. 3A where the electrical element is configured for broadcasting messages, the carrier frequency or bands may include, for example, a Bluetooth channel, Blue Tooth Low Energy (BLE) and long range related protocols (LORA). Long-range (LORA) frequencies may also be useful. These include frequencies typically below 1 GHz, such as 868 MHz.

For the illustrative embodiment depicted in FIG. 3B where the electrical element is configured for bi-directional communication, the carrier frequency or bands may include a Wi-Fi channel, or other non-cellular band of radio frequencies.

Other communication service bands that may be used for the carrier frequency of this disclosure include frequency ranges such as 400-700 MHz, 700 MHz-1 GHz, 1 GHz-1.6 GHz, and 1.6 GHz-2.7 GHz.

The protocol module 313 is an electronic media containing a set of instructions for packaging and transmitting the data generated by the sensor. The data package is transmitted from the radio transmitter over a radio frequency generated by the frequency generator 311.

More specifically, the protocol module 313 includes circuitry and software to implement a protocol. Examples of protocols include Bluetooth (BT), Blue Tooth Low Energy (BLE), long range frequencies (LoRa, also known as LoRaWAN, for wide area network), ZigBee™, or other protocols for enabling the electrical element to broadcast data from the radio transmitter to the second receiver of the remote antenna unit as discussed above. The protocol module 313 selects the suitable protocol to prepare and transmit messages. Other examples of useful protocols include logical link control and adaptation protocol (L2CAP), Bluetooth network encapsulation protocol (BNEP), radio frequency communication (RFCOMM), low energy security manager protocol (SMP), link manager protocol (LMP), and so forth.

In the illustrative embodiment shown in FIG. 3A, the protocol module 313 provides for uni-directional broadcast messaging of data from the electrical element to the second receiver of the remote antenna unit. In the illustrative embodiment shown and described in connection with FIG. 3B below, the protocol module shown therein provides for bi-directional messaging between the electrical element and the second receiver of the remote antenna and so in those embodiments may include protocols that allow for bi-directional messaging such as WiFi and other non-cellular messaging protocols.

The electrical element also includes the power source 309 to power the several elements of the sensor element. The power source may be a battery. Alternatively, power may be provided by an AC outlet in which case the electrical element may include a connector or a plug for such a connector to the AC outlet. In either case, the processor 305 with associated memory (not shown) may manage the power provided by the power source to the other components of the electrical element by power save mode or sleep mode of operations. Such power management techniques and other power management techniques known to one skilled in the art may be used to provide management of the power provided by the power source in the electrical element of this disclosure.

Some electrical elements 300 may also require and include the analog-to-digital converter (ADC) 315 to convert the electrical signal representation of the value of the condition or property generated by the sensor into a digital data if the communication protocol of the electrical element requires a digital format. More specifically, the analog-to-digital converter 315 may be needed to convert analog readings from the sensor 301 into digital values for storage into the value register or memory 303. In other instances, the simple change of the electrical output of a sensor serves as a digital representation for storage in the value register 303 and for packaging by the protocol module 313 into a data package for broadcast transmission from the transmitter 307 to the second transceiver of the remote antenna unit previously discussed.

In operation, the electrical signal representation of the value of the condition or property generated by the sensor 301 is stored in the value register 303. The frequency generator modulates this data and the modulated data is packaged by protocol module 313 into a data package. The data package is then broadcast by the transmitter 307 over the carrier frequency generated by the frequency generator to the second transceiver of this disclosure. These operations illustrative occur under the control of the processor 305.

FIG. 3B depicts another embodiment of an electrical element 330 wherein the electrical element is configured for bi-directional communication. The electrical element 330 differs from electrical element 300 primarily in that this electrical element 330 has a bi-directional transceiver 337, rather than the transmitter 307 of electrical element 300 which provides only broadcast messaging. In addition, the protocol module 343 of electrical element 330 includes protocols for bi-directional communication unlike the protocol module 313 depicted in FIG. 3A which is illustratively configured with protocols providing for uni-directional communication. Moreover, memory 333 is typically a memory device to support the greater memory requirements that may be required for bi-directional communication.

Beyond the foregoing primary differences, the sensor element 331, processor 335, power source 339, frequency generator 341 and A/D converter 345 depicted in FIG. 3B illustrative perform similar functions and operations as like components described in connection with FIG. 3A and the descriptions of those components in FIG. 3A are applicable to the description of like components in FIG. 3B.

Hence, in the illustrative embodiment shown and described in connection with FIG. 3B, the protocol module provides for bi-directional messaging between the electrical element and the second receiver of the remote antenna and so in those embodiments may include non-cellular protocols that allow for bi-directional messaging such as WiFi and so forth. In contrast, and as previously discussed, in the illustrative embodiment shown in FIG. 3A, the protocol module 313 provides only for uni-directional broadcast messaging of data from the electrical element to the second receiver of the remote antenna unit.

One of the advantages of electrical element 330 is that the bi-directional communication provided by protocol module 343 and transceiver 337 allows for the distributed antenna system (DAS) of this disclosure to control the electrical element 343 unlike in electrical elements which are configured only for broadcast messaging.

Electrical elements 300 and 330 may take the form factor of a tag or a chip. Each may also take the form factor of a computing device. In the case of electrical element 300 the computing device could be any computing device (e.g., smart phone, personal computer, or server) configured with a transmitter 307 to provide broadcast messaging. In the case of electrical element 330, the computing device could be any computing device (e.g., smart phone, personal computer, or server) configured with a transceiver 337 which provides for bi-directional communication.

Hence, electrical elements 300, 330 for use in this disclosure may take the form factor of any computing device including user equipment include a cellular phone, a smart phone, or other device, such as a table or a personal digital assistant. Of course, electrical elements 300, 330 in the form factor of a tag or a chip may be widely used in the automation system of this disclosure.

FIG. 3C depicts an illustrative electrical element for use with appliances. For example, many appliances, with which the Internet of Things (IoT) Automation System of this disclosure may be used, need not include a sensor. Examples of such electrical elements may be household devices, such as a washing machine, toaster oven, dish washer, copying machine, or any other device, that is equipped with a communication ability, and that have its protocol supported by the IoT automation system of this disclosure. FIG. 3C contains the same elements as FIG. 3A except for the sensor 301 described in FIG. 3A, and the function and operation of these elements in FIG. 3C are as described in connection with FIB. 3A.

With the foregoing disclosure of electrical elements for use with this disclosure, we now turn to describing the use of these electrical elements in the automation system of this disclosure.

Figure 4:
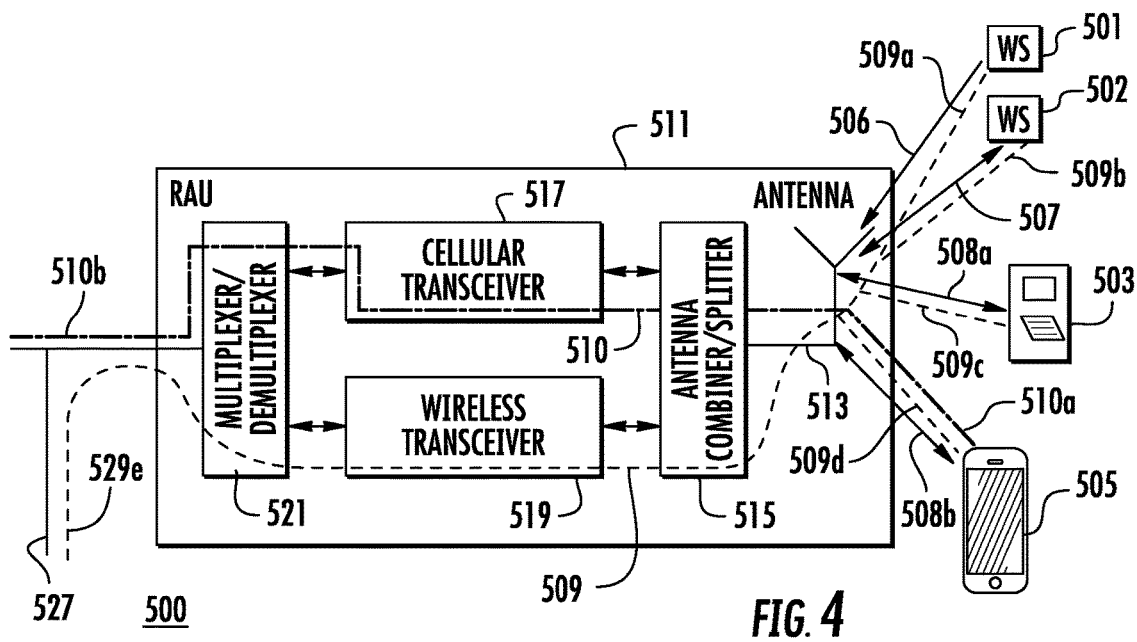
FIG. 4 is a schematic depiction of a first embodiment of a remote antenna unit (RAU) according to the present disclosure.

FIG. 4 depicts a first embodiment of a remote antenna unit (RAU) of a system 500 according to the present disclosure employing one or more electrical elements 501, 502 as described above. More than one transceiver type can be present on, in, or attached to, the RAU.

System 500 includes a remote antenna unit 511 for communication with a wireless element 501, 502 for purposes of building automation as herein described. FIG. 4 also shows a computer 503 and user equipment 505 also in communication with the remote antenna unit 511. Electrical elements 501, 502, computer 503, and user equipment 505 use the remote antenna unit 511 for communicating with a head end unit (not shown) and are deemed to be users of the remote antenna unit 511. The electrical element 501 is the electrical element discussed above in connection with FIG. 3A with a capability of communicating one way with the remote antenna unit 511 by a broadcast message to form a broadcast link 506 with remote antenna unit 511 as discussed in FIG. 3A. Electrical element 502 is the electrical element discussed above in connect with FIG. 3B with a capability of communicating bi-directionally to form a bi-directional link 507 with remote antenna unit 511 as discussed in FIG. 3B. As previously discussed, electrical elements 501, 502 may take any form factor including a tag, a chip, a user equipment, or other computing device. So long as the device includes the components described in connection with FIGS. 3 above, the device is an electrical element for purposes of this disclosure.

The computer 503 may be a computing device, such as a personal computer or server, with a capability of communicating bi-directionally to form a bi-directional link 508a with remote antenna unit 511 within the coverage area of remote antenna unit 511. The user equipment 505 may be a smart phone or similar or other type of user equipment, with a capability of communicating bi-directionally to form a bi-directional link 508b with remote antenna unit 511 within the coverage area of the remote antenna unit. Other examples of user equipment may include laptop computers, tablet computers, pad-type computer or other mobile devices useful to people working in the coverage area. Both computer 503 and user equipment 505 are illustrative configured for bi-directional communication as shown by bi-directional communication links 508b and 508c, respectively. However, it will be appreciated that these user equipment may also include functionality configured for only uni-directional communication—namely, computer 503 and user equipment 505 may be provided with functionality that is configured to only broadcast and not receive messages.

Advantageously, the remote antenna unit 511, which may be one of a plurality of remote antenna units distributed throughout the deployment site (e.g., different rooms of a building) as previously explained comprises a first transceiver 517 (which may be a cellular transceiver in one embodiment) configured for uplinking and downlinking a signal of a cellular service; and a second transceiver 519 configured for uplinking a signal of at least one electrical element. Although FIG. 4 shows a single wireless transceiver 519 as the second transceiver, in other embodiments, there may be additional second transceivers and the additional second transceivers are not limited to wireless transceivers, but may be any type of transceiver. Cellular transceiver 517 and wireless transceiver 519 are radio receiver-transmitters suitable for sending and receiving radio signals of a remote antenna unit at relatively low power, suitable for as the case may be for electrical elements, personal devices and cell phones used in homes and buildings, and not primarily intended for high-power radio broadcasting. In another embodiment, the cellular transceiver 517 may also be configured to send and receive radio signals at a middle power level and/or at a high power level.

The uplinked signals 509a, 509b from electric elements 501, 502, and uplinked signals 509c, 510a from computer 503 and user equipment 505, respectively, are combined by antenna combiner splitter 515. Antenna combiner splitter 515 may also split signals that are destined to the electrical element 502, computer 503, and user equipment 505 but not electrical element 501 which as previously explained is configured only for broadcast messaging in this example. More specifically, combiner/splitter 515 comprises communications equipment for receiving uplink radio signals from electrical elements 501, 502, computer 503, and user equipment 505 and combining them into a signal for application to transceivers 517, 519, which discern the signals they are configured to discern and process and apply those discerned and processed signals to multiplexer 521 for further routing according to this disclosure. Antenna combiner/splitter 515 further comprises communications equipment for splitting downlink radio signals from transceivers 517, 519 and routing them to antenna 513 for broadcasting to electrical element 502, computer 503, and user equipment 505 but not electrical element 501 which, as previously explained, is configured only for broadcasting messages (i.e., it is not configured to downlink messages.) Although the embodiment of FIG. 4 shows the antenna combiner/splitter 515 and a single antenna 513, there could be two separate antennas without a combiner/splitter in another embodiment.

The uplinked signals 509a, 509b from electric elements 501, 502, respectively, as well as the uplinked signal 509c from computer 503 and any uplinked signal from user equipment 505 that is not a cellular signal, are, in the combined signal from the antenna 513, advantageously recognized and processed by the second transceiver 519 which is configured for uplinking signals non-cellular signals. Contemporaneously, the uplinked signals 510a from user equipment 505 which is a cellular signal—and other cellular signals picked up by remote antenna unit 511 from other user equipment in the coverage area of the remote antenna unit—are, in the combined signal from the antenna 513, advantageously recognized and processed by the first transceiver 517 which is configured for uplinking cellular signals.

The uplinked signals 509a, 509b from electric elements 501, 502, respectively, and uplinked signals 509c from computer 503 (and any non-cellular signal from user equipment 505) so processed by the second transceiver 519 are multiplexed by multiplexer/demultiplexer 521 and the multiplexed signal 529e is further processed by the automation system of this disclosure as explained below. Similarly, the uplinked signal 510a from user equipment 505 signal—and other cellular signals picked up by remote antenna unit 511 from other user equipment in the coverage area of the remote antenna unit—are multiplexed by, multiplexer/demultiplexer 521 and the multiplexed signal 510b is processed by the distributed antenna system (DAS) as also described below.

Figure 8:
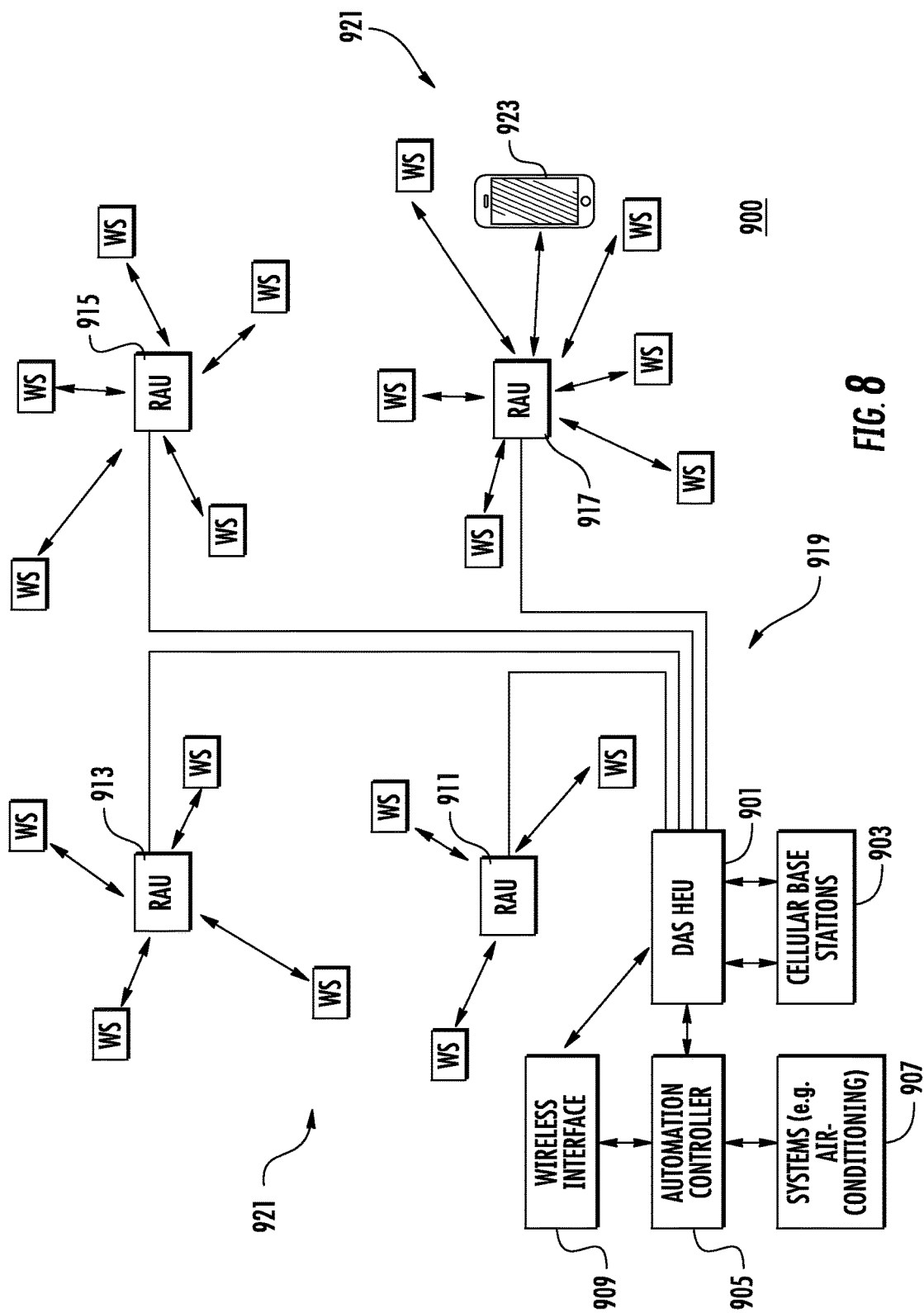
FIG. 8 depicts a second embodiment of an IoT automation system of this disclosure.

In the downlink direction, multiplexer/demultiplexer 521 receives downlink signals from a head end unit (see FIG. 8)

that are destined for the electrical element 502, computer 503, and user equipment 505 (but not electrical element 501 which only broadcasts but does not receive any messages) and separates the signals for routing to the proper transceiver, whether the cellular transceiver 517 or the wireless transceiver 519. The multiplexer/demultiplexer does the same for the downlinked cellular signals. System 500 thus connects electrical elements 501, 502, computer 503, and user equipment 505 with a single antenna 513 of the remote antenna unit 511. Alternatively, two antennas may be provided in place of the single antenna 513, a first antenna tuned for pickup of uplink signals from electrical elements 501, 502 and downlink signals to electrical element 502. Alternatively, the first antenna may also be tuned for uplink and downlink of signals to computer 503. A second antenna may be tuned for pickup of uplink signals and transmission of downlink signals to user equipment 505. Alternatively, the second antenna may also be tuned for uplink and downlink of signals to computer 503.

Within the remote antenna unit 511, the connections may be made by fiber optic cable, by metallic conductor pairs, wirelessly, or a combination of these, as desired and as convenient. Remote antenna unit 511 may route communications to the head end unit through a fiber optic cable that comprises both voice and data signals. Alternatively, the head end unit may communicate wirelessly with the remote antenna unit.

An important consideration in this system is its longevity, especially as concerns system operation and battery life. The automation system of this disclosure may extend the life of electrical elements used in the automation system because the electrical elements are in the line of site of remote antenna units which may be widely distributed throughout a deployment site. Hence, the electrical elements need not expend power for relaying messages from electrical elements that are not in the line of site of a remote antenna unit of the distributed antenna system.

Figure 5:
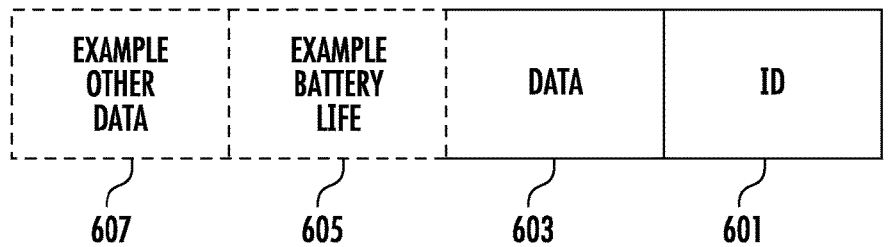
FIG. 5 depicts schematically an electrical element data package according to the present disclosure.

In addition, as shown in FIG. 5, a data package broadcast by an electrical element may be compact, requiring a minimum of time to generate, prepare and transmit. The data package depicted in FIG. 5 may be broadcast by the transmitter 307 in FIG. 3A or the transceiver 337 in FIG. 3B. In this example, the data package may include an identification 601 of the device, such as the particular electrical element, and the data 603 itself, e.g., an electrical representation of temperature from a temperature element, an indication of motion from a motion sensor, and so forth. In other embodiments, as shown by the phantom lines in FIG. 5, the data package may include an indication of battery life 605 or other data 607, as desired. The battery life may provide the automation system of this disclosure with useful information on the status of batteries in electrical elements deployed throughout the deployment site. The battery levels of the electrical elements may be monitored and any battery failures may be immediately identified so that the electrical element having the battery issue or the battery source of an electrical element may be replaced.

The field for other data 607 may include additional information about the electrical element such as the destination address of the electrical element or some other information. The destination address may be used by the automation system of this disclosure for purposes of addressing messages if the electrical element is one that is configured for bi-directional communication. As another example, the field for other data 607 may include data on the performance of components in the electrical element. For example, the data may indicate the time of day each reading of a parameter is taken by the sensor of the electrical element, if the sensor is configured for sampling. The automation system of this disclosure may collect and use this and other data included in data field 607 in making adjustments to electrical elements in the automation system, adjustments to systems such as a heater, an air conditioner, video-surveillance, elevators, and so on, and adjustments to electrical elements in the form factor of computing devices.

In another embodiment, longer battery life of the electrical sensors is aided because the processor 305, 335 of electrical elements 300, 330, respectively, may manage their respective power source by employing low power mode or sleep mode of operation. In the case of sleep mode, timers may wake up the electrical element for the purpose of broadcasting a message or if the electrical element is configured for bi-directional communication, to receive incoming messages.

Figure 6:
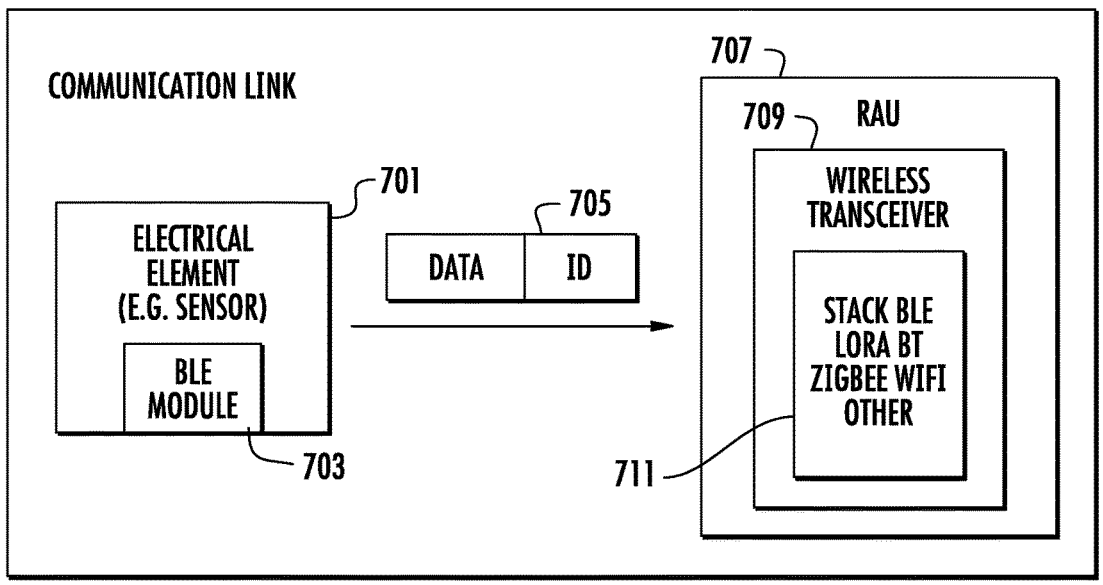
FIG. 6 schematically depicts communications between an electrical element and a remote antenna unit, using another embodiment of an electrical element data package.

FIG. 6 depicts a communication link 700 between an electrical element 701, such as a wireless sensor, and an in-range remote antenna unit (RAU) 707 with which a communication link is made. This example is consistent with the design of an electrical element 300 in FIG. 3A since it shows communication occurring only as an uplink message that is broadcast by the electrical element. The link allows for communications between the electrical element and the components of the automation system of this disclosure in the manner described below.

On the electrical element side of the link and as noted, the electrical element 701 configured according to FIG. 3A in this example includes a protocol module which includes an electronic media with instructions to execute a particular protocol such as Bluetooth™ An illustrative Bluetooth™ Low Energy (BLE) module 703, may be one that is marketed as Bluetooth™ Smart. This is a wireless personal area network technology designed for reduced-power transmission within a limited range, typically using a 2.4 GHz frequency. Devices with this technology are available from a number of manufacturers and using a variety of operating systems, including Android 4.3, iOS 5 and later, BlackBerry 10, Windows 8, Windows Phone 8.1 etc. Manufacturers with chipsets optimized for Bluetooth Smart include Texas Instruments, STMicroelectronics, Nordic Semiconductor, Dialog Semiconductor and Cambridge Silicon Radio. Other commercially available modules configured to execute one or more of the protocols described for use with electrical elements as previously described are also available and may be used with this disclosure. Of course, in an alternative embodiment using an electrical element depicted in FIG. 3B, the communication could be bi-directional and the protocol module would be provided with one or more protocols for bi-directional communication with the remote antenna unit.

On the remote antenna unit 707 side of the communication link, the remote antenna unit 707 includes the wireless transceiver 709 along with the cellular transceiver (not shown). As depicted in FIG. 6, the wireless transceiver may include a stack of instances configured to execute the different protocols with which the wireless transceiver 711 may be used. In the illustrative example depicted in FIG. 6, the stack 711 of the wireless transceiver 709 is configured with the applications necessary for executing the BLE, Lora, Bluetooth, ZigBee™, WiFi, and other protocols useful for deciphering messages from the electrical element. The remote antenna unit 707 may execute the appropriate application to communicate with the protocol used by the incoming message.

Figure 7:
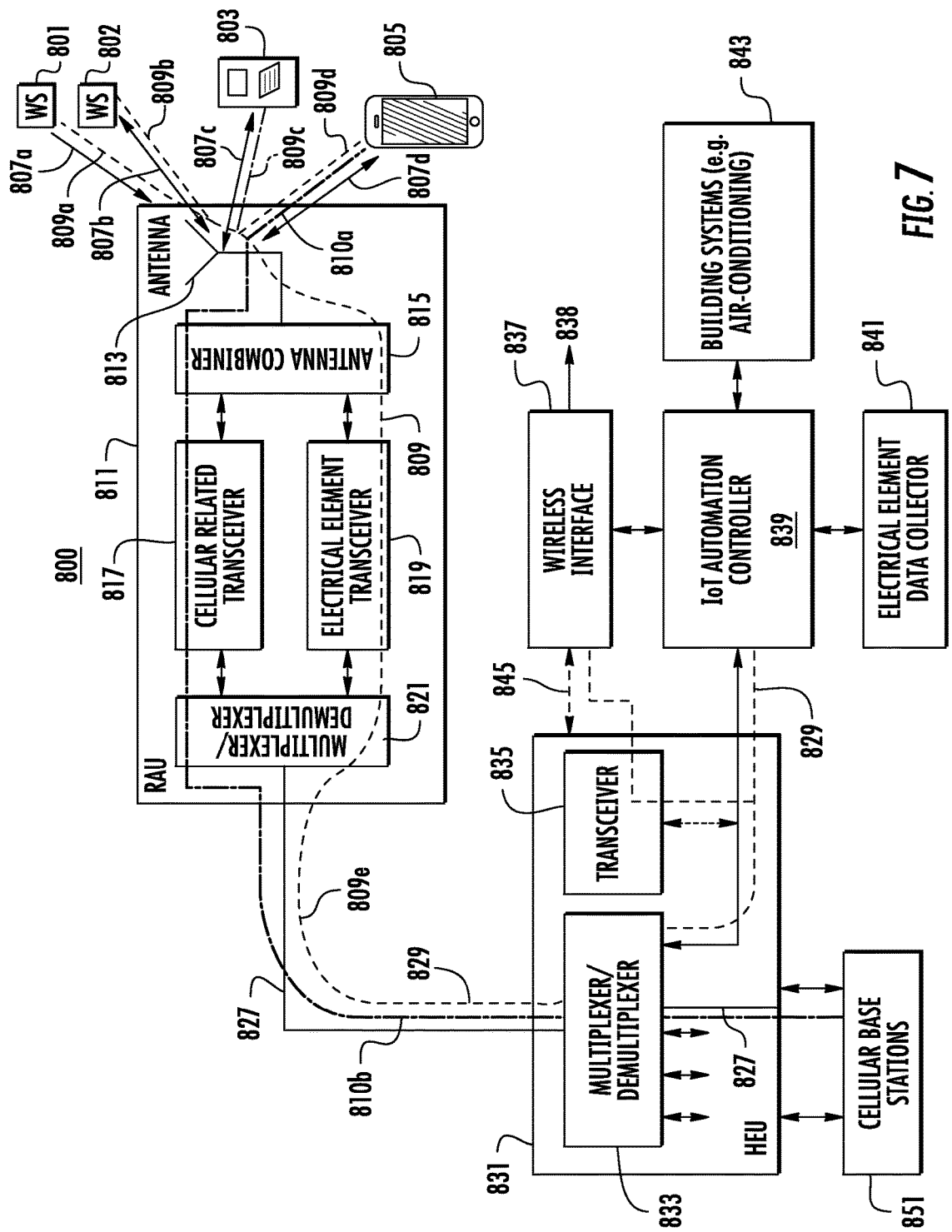
FIG. 7 depicts a first embodiment of an IoT automation system according to the present disclosure.

FIGS. 7-8 depict embodiments of the automation system of this disclosure. An illustrative embodiment is system 800 in FIG. 7. Wireless distribution system 800 is intended to serve one or more electrical elements 801, computers 803 and user equipment 805, such as smart phones. One-way broadcast messaging is depicted by communication link 807a established by electrical element 801 and bi-directional messaging is depicted by communication links 807b,c,d established by electrical element 802, computer 803, and user equipment 805. The dashed-line indicates the path 809a,b,c,d that is taken by the non-cellular signals received from electrical element 801, 802 computer 803, and user equipment 805. For more on the function and operation of the antenna 813, antenna combiner 815, electrical element transceiver 819, and multiplexer 821, refer to the discussion in connection with like components depicted in FIG. 4. The path taken by cellular communication signal 810a from the user equipment 805 through the remote antenna unit 811 is shown by the dot-dash-dot line in FIG. 7. For more about the communication links and paths taken by the signals generated by elements 801, 802, computer 803, and user equipment 805 through the remote antenna unit of this disclosure, and the operation of the various components of the remote antenna unit on these signals, refer to the discussion in connection with FIG. 4.

As described in FIG. 4, the output from multiplexer/demultiplexer 821 includes multiplexed signals of two kinds—multiplexed cellular signals and multiplexed non-cellular signals. The multiplexed cellular signals are depicted by the dash-dot-dash line 810b and the multiplexed non-cellular signals are depicted as dashed-line 809e. These signals travel to the head end unit 831 on optical fibers, on one fiber of a two-conductor optical fiber, on one conductor of a twisted-pair metallic conductor, or on other suitable conductor between the remote antenna unit 811 and head end unit 831.

As seen in FIG. 7, at the head end unit 831, the multiplexed cellular signals are demultiplexed by multiplexer/demultiplexer 833 and wirelessly transmitted to cellular base stations 851 in a manner well known in the art. In other embodiment, the transmission of the cellular signals to the cellular base stations 851 may be via wired transmissions. On the reverse or downlink path, multiplexer/demultiplexer 833 multiplexes the signals received from the base stations for transmission to the remote antenna units and the clients covered by the remote antenna units of the distributed antenna system.

The multiplexed non-cellular signals on path 809e are also demultiplexed by multiplexer/demultiplexer 833. If the non-cellular signals are from electrical elements of this disclosure they may be routed to the IoT automation controller 839 either through physical media 829 or to wireless interface 837 through wireless link 845. If the non-cellular signals are other non-cellular signals, such as a WiFi communication between computer 803 or user equipment 805 and the Internet, the signal may be routed to the wireless interface 837 for transmission over path 838 to a hotspot that connects that WiFi communication with the Internet (not shown). Alternative transmission over 838 may be to a hotspot that connects to another intra-network or internetwork.

The data from the electrical elements may be stored in electrical element data collector 841. The electrical element data collector may be located in a database in the head-end unit or elsewhere in the distributed antenna system (DAS). The head end unit (HEU) provides an Internet gateway to and from this database to allow access to this data by a public or private network over the Internet. Addressing this Internet gateway may be by the Internet address assigned to the head end unit (HEU). Hence, the electrical element data collector may be accessed from anywhere over the Internet by simply addressing a request to the IP address of the head end unit (HEU). Of course, the electrical element data collector may also be accessed by any private or public network by other than over the Internet.

Alternatively, the electrical element data collector may be located remotely from the distributed antenna system. For example, the electrical element data collector may be located on a computing device in the "cloud" and be accessible from within and without the distributed antenna system (DAS) over the Internet. As another example, the electrical element data collector may be located on a computing device that is accessible through a private or public network other than over the Internet.

The electrical element data collector 841 may be implemented in any number of ways. The electrical element data collector 841 may include a microprocessor and a memory (not shown) for processing the data and controlling, improving or optimizing some aspect of the deployment site. Ways in which the memory may be implemented include, by way of example and not of limitation, nonvolatile memories (NVM), read-only memories (ROM), random access memories (RAM), any combination of these, etc. . . .

Memory may include programs containing instructions for execution by IoT automation controller 839 or other processors that may be included in the automation system of this disclosure. The programs provide instructions for execution by the IoT automation controller, and can also include instructions regarding protocols and decision making analytics, and/or business intelligence features, etc., that can be used by IoT automation controller in determining and issuing instructions within the IoT automation system. These instructions are illustratively issued by IoT automation controller to building systems 843 or devices within such systems. Building systems 843 may include heating systems, cooling systems, security systems, elevator systems, or any other system used in the building or site at which the distributed antenna system of this disclosure is deployed. Alternatively, these instructions may be issued by IoT automation controller 839 to electrical elements within the IoT automation system that are configured for bi-directional communication. If the electrical element is in the form factor of a computing device, these instructions may be issued to computing devices within the network.

In short, this disclosure advantageously provides a distributed antenna system that is configured to route cellular signals to cellular base stations 851 and to route non-cellular signals to a deployment site controller, such as a IoT automation controller 839 for use in controlling building systems, computing devices that are part of the building system, electrical elements of this disclosure, including electrical elements in the form factor of a computing device. In this way, the automation system of this disclosure may illustratively monitor and control systems and devices with such systems and electrical elements, including electrical elements in the form factor of computing devices, within or about a building or any other site at which the distributed antenna system of this disclosure is employed. For example, electrical elements may be distributed throughout a building to measure temperature and humidity throughout the building. The data from these electrical elements may then be used to control a building system 843 that is an air-conditioning system. The electrical element data collector 841 may then decide that the data suggests that additional heating, additional cooling, or a different set point for the heating or cooling of a room in the building is required. The controller 839 may then issue a command to the air conditioning system 843 that instructs the air conditioning system to increase or decrease the cooling output of a cooling device in that system, or set a different set point or other parameter for the cooling of the building. As another example, IoT automation controller 839 may rely on protocols and decision making analytics, etc. in determining the on and off times of the air conditioning system and one or more devices that make up the system. For example, the IoT automation controller may turn on or off individual air conditioning units in different parts of the building or open and close vents, where automated, throughout air conditioning system in the building to provide better flow and distribution of cool air throughout the building.

The IoT automation controller of this disclosure may be configured to determine adjustments to the air conditioning system or other systems or devices with the automation system based on the received electrical element data or on demand. Similarly, the IoT automation controller may be configured to determine adjustments to electrical elements of this disclosure including electrical elements in the form factor of a computing device. In the foregoing and other way, this disclosure configures a remote antenna unit to serve as an IoT hub which is in communication with electrical elements and electrical elements in the form factor of computing devices as well as devices that make up the building system 843 and that are in the coverage area of the remote antenna unit. In other words, where the electrical elements are configured for bi-directional communication, the IoT hub of this disclosure allows electrical elements to be controlled from the IoT hub. This in addition to the control by the IoT hub of devices within the building systems 843.

In addition, the IoT hub may further control any device in the coverage area of the IoT hub that is in wireless communication with the IoT hub. More specifically, if a device is configured for bi-directional communication it may be in communication with and be controlled through the IoT hub even though that computing device may not include a sensor or other component that make up the electrical element of this disclosure.

Another embodiment of an IoT automation system according to the present disclosure is depicted in FIG. 8. Automation system 900 includes multiple remote antenna units 911, 913, 915, 917 which are arranged so that each electrical element (e.g., wireless sensor WS) in the building or deployment site is in the line of sight of one of the remote antenna units. Although FIG. 8 shows the multiple remote antenna units 911, 913, 915, 917 arranged so that each electrical element (e.g., wireless sensor WS) in the building or deployment site is in the line of sight, being in the line of sight is not necessarily required in all embodiments described herein. That is to say, each electrical element is within the coverage area of a remote antenna unit. In this embodiment, each electrical element (e.g., WS) is in direct communication with a remote antenna unit. In other words, no electrical element (e.g., WS) need serve (although it can) as a relay to communicate signals from another electrical element to the remote antenna unit. This architecture helps to conserve battery life for all the electrical elements that are deployed as part of the system since each electrical element need only broadcast its own messages.

System 900 includes a distributed antenna system head end unit 901 in communication with one or more cellular telephone provider base stations 903 for providing cellular voice and data communications services. Head end unit 901 communicates with a plurality of remote antenna units 913, 915, 917 through a plurality of conductors or media 919, which may be fiber optic cable, twisted-pair conductors, coaxial cable, or other convenient conductors. Head end unit 901 is also in contact with a deployment site controller 905 which controls the systems 907 (e.g., air conditioning, heating, security, etc.) that may be included in the automation system depicted in FIG. 8. Alternatively, deployment site controller 905 may be configured to control systems at other deployment sites. In some embodiments, IoT automation controller 905 may also be equipped with a wireless interface 909 for direct communications with one or more of the wireless sensors. Elements 901, 903, 905, 907, and 909 in FIG. 8 have like function and operation to like elements depicted in FIG. 7.

As seen in FIG. 8, remote antenna units 911, 913 are in direct wireless contact with a plurality of electrical elements (e.g., wireless sensors WS). In each of the coverage areas provided by remote antenna units 911, 913, and 915, the electrical elements (e.g., wireless sensors) may, in one embodiment, configured for broadcast messaging only (i.e., one-way communication with the remote antenna unit.) In the coverage area provided by remote antenna unit 917, the electrical elements (e.g., wireless sensors) may be, in one embodiment, configured for bi-directional messaging. A user equipment 923 is also shown in the coverage area. However, as previously explained, the electrical element may have the form factor of a user equipment or other computing device. For example, an electrical element configured for bi-directional communication according to FIG. 3B may be in the form factor of a user equipment. Alternatively, a computing device or user equipment may be configured to provide broadcast messaging by an application or otherwise in which case that computing device or user equipment may serve as an electrical element providing broadcast messaging as described in FIG. 3A.

One advantage of the automation system of this disclosure is that it leverages the wireless footprint of a distributed antenna system (DAS) implemented in a building or other deployment site for building automation purposes. The wide distributed footprints attainable with a distributed antenna system make it possible to distribute electrical elements throughout a deployment site in a way that the electrical elements may be within the line of sight of at least one radio antenna unit of the distributed antenna system, although being in the line of sight is not necessarily required. This means that less power is required for an electrical element to message a receiver of an automation system since the electrical elements may be positioned within the building for quality reading of parameters at ideal power requirements.

As explained, the information gathered by the wireless distribution system, as discussed above, is collected by the electrical element data collector of FIG. 7. The data collector 841 shown in FIG. 7 collects and organizes data from electrical elements through the distributed antenna system and the remote antenna units. Data collector 841 may include a microcontroller for controlling and organizing the flow of data into the collector and storing it. Storage or memory is provided in the data collector.

Figure 9:
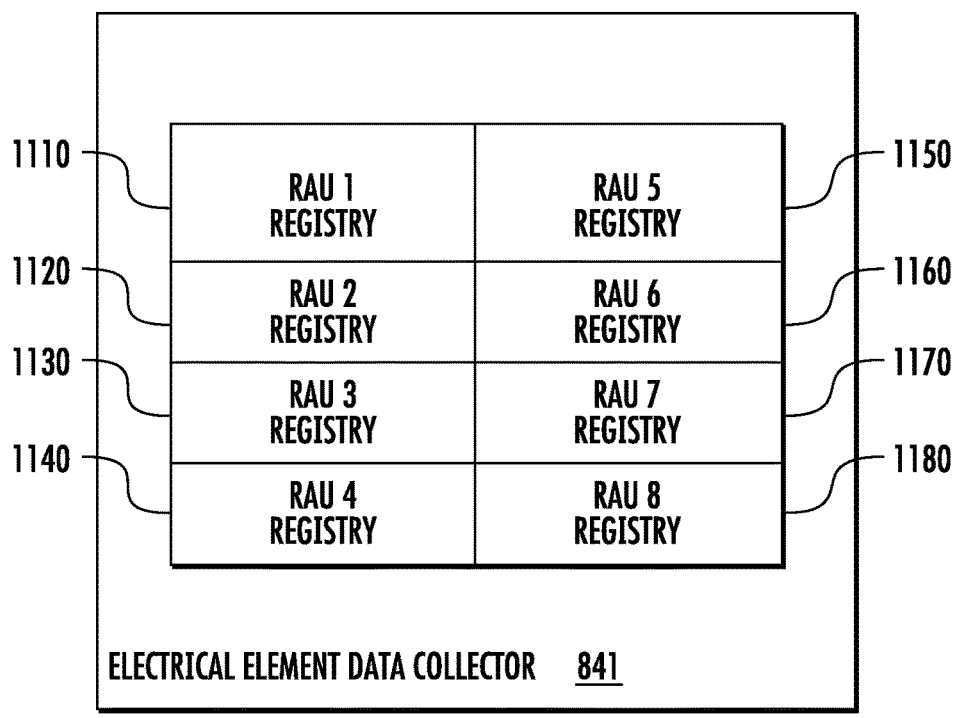
FIG. 9 depicts a data structure of an electrical element data collector of this disclosure.
Figure 10:
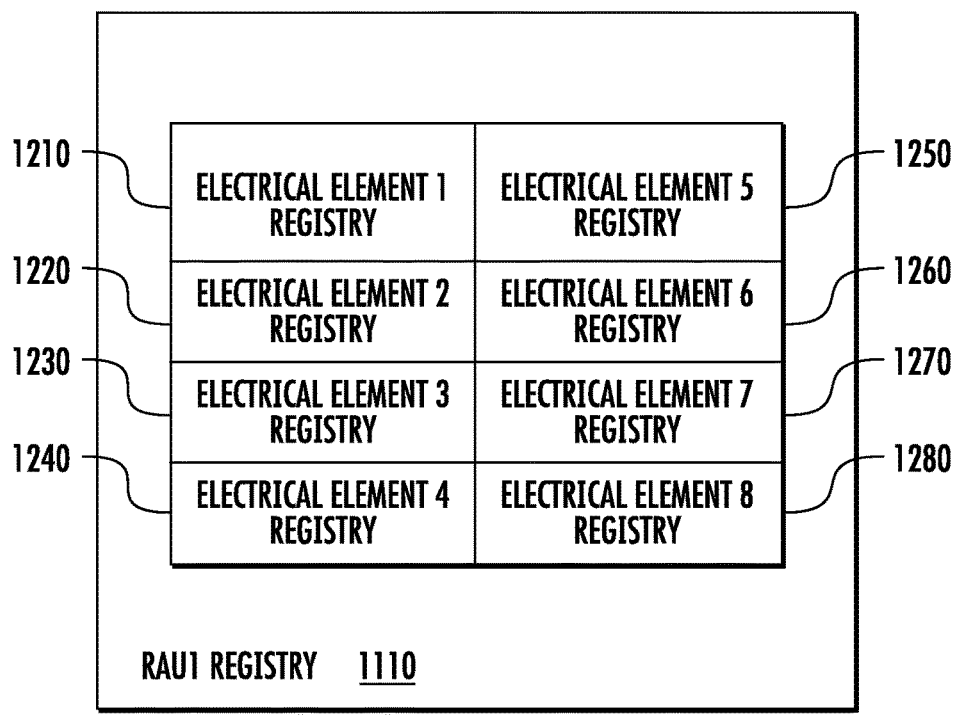
FIG. 10 depicts an illustrative memory map for the electrical element data collector shown in FIG. 9.
Figure 11:
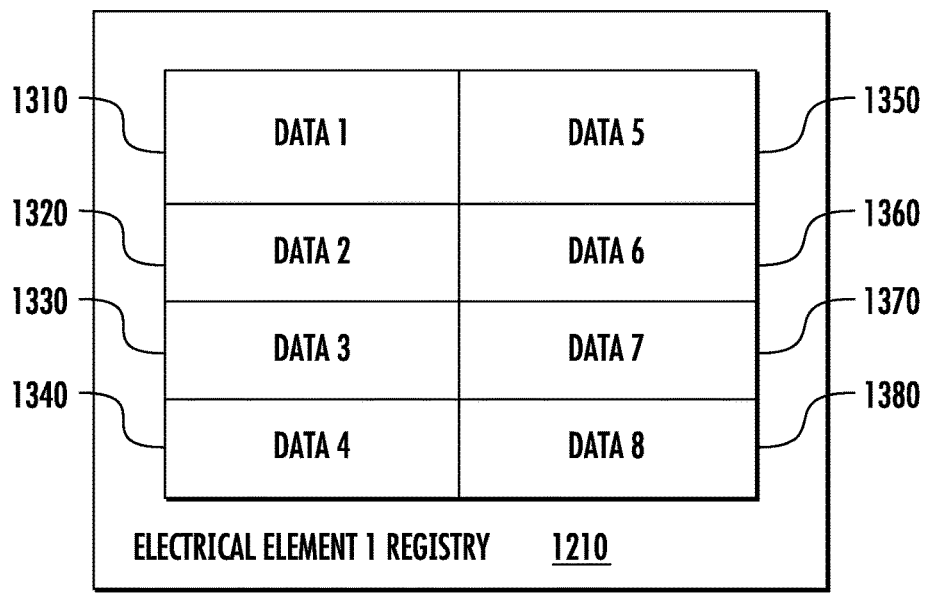
FIG. 11 depicts an alternative illustrative memory map for the electrical element data collector shown in FIG. 9

As seen in FIGS. 9-11, memory in the data collector 841 may be organized to store data from each remote antenna unit served by the distributed antenna system. FIG. 9 depicts a data structure for the data collector 841 of FIG. 7, including a registry 1110 for RAU1, and similar registries or storage files 1120 through 1180 for each of the other RAUs as shown. However, the data need not be organized this way, and may be organized in any convenient manner. For example, the data may be organized by type of electrical element, or as desired, with the particular RAU being data associated with the electrical element. Other ways may also be used to organize and store the data.

An illustrative data organizational structure for the registry 1110 for RAU1 is detailed in FIG. 10. RAU1 registry 1110 includes all the gathered data for the electrical elements that are routed through the RAU1. As shown, the data may be organized by each user, e.g., a registry 1210 for electrical element 1. RAU1 registry 1110 may also include registries 1220 through 1280 for electrical elements 2 through 8, in this embodiment.

In the illustrative data structure shown in FIG. 11, the registries may be organized as desired for convenience or for emphasis on the improvements perceived as needed for the distributed antenna system or a particular component or system element. Important data parameters from the electrical element may be organized or stored in these or other ways. Other parameters, such as performance parameters for the electrical element, may also be gathered and stored.

Data may be further organized and stored for each electrical element, such as the registry 1210 for electrical element 1, as depicted in FIG. 11. This figure depicts a plurality of data points 1310-1380, each point consisting of a datum, e.g., a temperature reading, a pressure reading, a proximity reading, an on/off reading, and the like. The data points may be organized as sequential in time, organized by one or more sensors if the electrical element has more than one sensor element, and so forth. The data may be used, as stated, in computer programs stored in an IoT automation controller, such as IoT automation controller 839 (FIG. 7) for optimizing communications and controlling desired aspects of the building or other deployment site for the wireless distribution system. The data may be employed in algorithms in the software to optimize network communications and desired aspects of the site.

Figure 12:
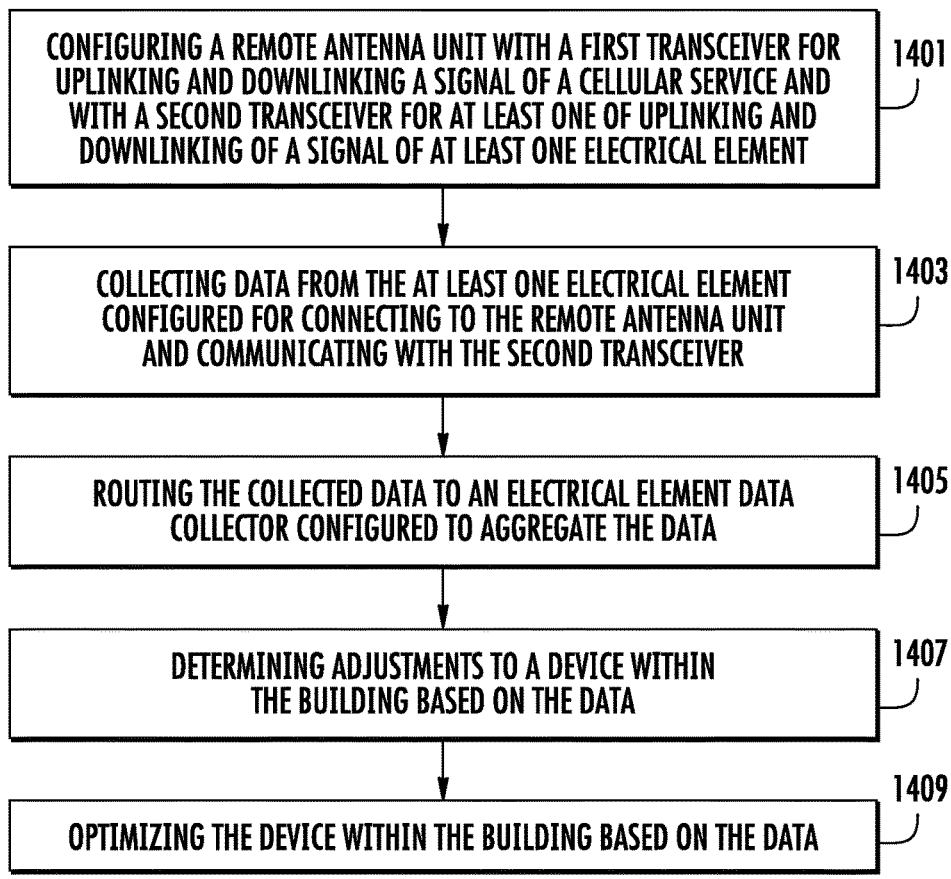
FIG. 12 depicts a method for automating a deployment site according to this disclosure.

A method for maintaining communications and optimizing a device within a deployment site is depicted in FIG. 12. In the method 1400 of FIG. 12, a remote antenna unit is configured 1401 with a first transceiver for uplinking and downlinking a signal of a cellular service and with at least one second transceiver for at least one of uplinking and downlinking a signal of at least one electrical element. The at least one electrical element is configured for connecting to the remote antenna unit and for communicating with the one or more second transceivers. Data is then collected 1403 from the at least one electrical element. As discussed above, the at least one electrical element may be in the form factor of a smart sensor, user equipment, or other electrical device for sensing and reporting data about a parameter. The collected data is then routed 1405 to an electrical element data collector for aggregating the data. This data may then be used to determine adjustments 1407 or action to be taken within the deployment site, such as a building, based on the data. The device or its use may then be optimized 1409 based on the data.

As discussed above with respect to FIG. 4, a remote antenna unit according to the present disclosure includes capabilities for at least two radio services, a cellular service and a non-cellular service for communicating data at least from the electrical elements. The method of FIG. 12 may be useful in demonstrating how the at least two services work together to allow use of the remote antenna units for normal cellular service and for reporting conditions within the building or other deployment site for the wireless distribution system. This disclosure shows how the remote antenna units can track conditions within the deployment site and may be used to improve or optimize operation of building systems or devices employed within the deployment site.

Data can be gathered from each electrical element nearby the remote antenna unit. The data may be routed to a data collector and to an optimization controller and may be very helpful in monitoring and optimizing equipment within the deployment site of a remote antenna unit. This educates a distributed antenna system about what is going on with site equipment or conditions, such as building conditions, in the distributed antenna system coverage area. Without this disclosure, the distributed antenna system may know little about equipment or conditions in a building. With this disclosure, the distributed antenna system can integrate and monitor a great variety of electrical elements and site equipment to provide building automation. The building or deployment site can take advantage of this disclosure with installation of only the electrical elements and the programming required to integrate the electrical elements into the distributed antenna system. Conventional building automation systems in contrast may require extensive deployment of transceivers, wiring, etc. which may be expensive. The distributed antenna system thus can be used to even greater advantage in virtually any situation that could benefit from building automation.

By integrating electrical elements into a distributed antenna system as provided by this disclosure the distributed antenna system is provided with information about the deployment site and conditions in the coverage area of the distributed antenna system. With sufficient electrical elements and the proper integration, the distributed antenna system modified to include the IoT automation controller, electrical element data collector, the disclosed routing, and connection with building systems and devices within the building is able to monitor a great variety of conditions within the deployment site, and also concerning equipment and processes within the site. As noted, these may include conditions of temperature, humidity, air composition, noise, light, smoke, movement, and the like. Utility consumption can be monitored, movement of devices and equipment can be tracked, door and window openings and closings can be monitored, all without having to provide infrastructure, such as wiring each piece of equipment or sensor into the system. The use of the automation system according to this disclosure thus affords many advantages for operators of the deployment site and the distributed antenna system.

By this disclosure, the infrastructure of a Wireless Distribution System (WDS) and its Distributed Antenna System (DAS) is shared between providing wireless connectivity to clients in a building and monitoring and controlling an automation system for a deployment site. This infrastructure for the site provides wireless service for a building, a wing or a floor of the building, or for several closely-spaced smaller buildings. A head end unit of the DAS and one or more remote antenna units provide communications between wireless sensors or other electrical elements that monitor conditions within the deployment site. The WDS transmits data from the electrical elements to a data collector. A controller uses the data to monitor and control conditions within the deployment site, with no requirement for additional infrastructure. The infrastructure of the WDS and the DAS is used as a shared resource to provide wireless services and to control the site environment.

As a result of sharing the already-installed infrastructure, an automation system is easily installed with little additional infrastructure. The user devices and personal devices described above may be deployed as electrical elements, with the already-installed infrastructure providing lines of communication between the electrical elements and the appropriate building systems. Examples are building environmental controls, monitoring systems, security systems, and the like. By sharing existing systems, the capital expenditures are minimized, with little need for additional installation expenses, such as wiring. With fewer runs, a smaller infrastructure and a more efficient operation, operating expenses are also minimized. The shared system may be considered as an internet of things application or an internet of things system.

The improved connectivity of the present disclosure thus enables unidirectional or bidirectional communication of a plurality of electrical elements with a remote antenna unit of a distributed antenna system, the systems of a wireless distribution system and the controllers for automating a deployment site of the wireless distribution system. This connectivity is achieved without having to wire the deployment site, such as building, and takes advantage of the infrastructure already available from a wireless distribution system and its distributed antenna system. In one sense then, the present disclosure advances an internet of things (IoT) concept for greater value and service to the users or occupants of the deployment site, by better connecting devices, systems and services as described herein.

Thus, the present disclosure provides a method and system for optimizing connectivity in a deployment site for a wireless distribution system (WDS) with a distributed antenna system (DAS). The deployment site makes use of one or more remote antenna units (RAUs) for connecting users having user equipment, such as cell phones, smart phone, table computers, and the like. The deployment site includes electrical elements, which may include sensors, for connecting with the one or more remote antenna units. The disclosure includes simultaneous monitoring by the distributed antenna system of this disclosure of the deployment site for these electrical elements through the one or more remote antenna units. The disclosure includes configuring the remote antenna unit with a first transceiver for uplinking and downlinking a signal of a cellular service and with at least one second transceiver for uplinking and, where the electrical element provides for bi-directional communication, downlinking of the signal to the electrical elements using a radio service, such as, Bluetooth, Bluetooth Low Energy, Wi-Fi, LoRa, Thread, or ZigBee™ service, depending upon whether the electrical element provides for unidirectional or bidirectional communication. Data is collected from the electrical elements configured for connecting to the remote antenna unit. The collected data is routed to a data collector configured to aggregate the gathered data. The aggregated data may be correlated and used in order to improve the automated control of the deployment site or to improve communications and connectivity within the site. The network may be optimized based on the correlated data.

The foregoing automation system and method enable a distributed antenna system (DAS) to illustratively provide an Internet of Things (IoT) hub. Illustratively, the remote antenna unit (RAU) of the distributed antenna system (DAS) may provide the Internet of Things (IoT) hub with the head end unit (HEU) providing a gateway to the Internet that receives data from the remote antenna units (RAUs) from within a deployment site and stores the data in a database for access from without the distributed antenna system (DAS) by a public or private network over the Internet. In this illustrative example, the head end unit (HEU) also functions as an IP translator that may (1) receive data from the remote antenna unit (RAU) communicated in any of a number of protocol formats (e.g., Blue Tooth Low Energy (BLE), Z-WAVE, ZigBee™, Wi-Fi, Thread, and long range related protocols (LoRa) connection such as SIGFOX; as well as bi-directional protocols, such as WiFi), (2) extract that data from such protocol(s), (3) store the extracted data in a database for access from without the distributed antenna system (DAS) over the Internet in response to a data access request, (4) and in response to a data access request over the Internet from outside the distributed antenna system (DAS), package the data from the database into data packages according to the IP protocol or other internet protocol for transmission over the Internet. Of course, the head end unit (HEU) may also package the data into data packages for transmission according to protocols other than the IP protocol or other Internet protocol in response to any request for data made from outside the distributed antenna system (DAS) over any private or public network.

In applying the Internet of Things (IoT) teachings of this disclosure in the realm of facilities management, the automation system and method of this disclosure may be configured for performing optimization activities within a building. In any teachings, this disclosure finds application in distributed antenna systems (DAS) comprising a fiber optic, coax, hybrid fiber coax, and other wired or wireless implementations.

In one embodiment, this disclosure includes an automation system for a deployment site. The automation system includes a wireless distribution system configured with a distributed antenna system (DAS) for receiving at least one cellular service from at least one base station, the distributed antenna system (DAS) comprising a head end unit (HEU) and a plurality of remote antenna units (RAU), the plurality of remote antenna units (RAU) being distributed over the deployment site, the head end unit (HEU) being configured for routing the at least one cellular service to the plurality of remote antenna units (RAU). At least one of the plurality of remote antenna units includes a first transceiver configured for uplinking and downlinking a signal of a cellular service and at least one second transceiver configured for uplinking a signal of at least one electrical element. The at least one remote antenna unit also includes an electrical element at or about the deployment site configured to generate an electrical signal on the occurrence of an event and to transmit the generated signal to the at least one second transceiver. The system also includes a router configured for connecting to the at least one of the plurality of remote antenna units, the router configured for routing data from the at least one second transceiver received from the electrical element and an automation controller configured to determine adjustments to the automation system based on the received electrical element data or on demand.

In some embodiments, the at least one second transceiver is further configured to downlink a signal to the electrical element. In some embodiments, the electrical element is further configured to execute an instance of a data service configured to collect data on the event. In some embodiments, the system also includes an electrical element data collector configured to aggregate the collected electrical element data. In some embodiments, the automation controller is further configured to correlate the aggregated data to determine adjustments to the automation system based on the correlated data. In some embodiments, the electrical element comprises a sensor element, a processor, a value register, a protocol module, and a transmitter. In some embodiments, the electrical element further comprises an A/D converter. In some embodiments, the electrical element comprises a sensor element, a processor, a memory, a protocol module, and a transmitter/receiver. In some embodiments, the protocol module comprises circuitry and software to implement a protocol selected from the group consisting of Blue Tooth Low Energy (BLE) and long range related protocols (LoRa). In some embodiments, the protocol module comprises circuitry and software to implement a protocol selected from the group consisting of Blue Tooth Low Energy (BLE), long range related protocols (LoRa), and WiFi. In some embodiments, the long range frequencies (LoRa) are frequencies in a sub-G domain of frequencies.

In some embodiments, the distributed antenna system (DAS) provides an IoT hub. In some embodiments, the automation controller is further configured for performing optimization activities within a building. In some embodiments, the optimization activities include instructing a change in configuration or control of at least one piece of building equipment. In some embodiments, the collected electrical element data is accumulated over a period of time. In some embodiments, the collected data is mapped against criteria of the at least one building equipment for use in changing the settings of the at least one building equipment. In some embodiments, the mapping occurs in real time.

Another embodiment of this disclosure is a method. This is a method for automating a site served by a distributed antenna system (DAS) for receiving at least one service from at least one base station, the distributed antenna system (DAS) comprising a head end unit (HEU) and a plurality of remote antenna units (RAU), the plurality of remote antenna units (RAU) being distributed over the site, the head end unit (HEU) being configured for routing the at least one service to the plurality of remote antenna units (RAU). The method includes steps of configuring the site with a plurality of remote antenna units (RAU), at least one of the plurality of remote antenna units comprising a first transceiver for uplinking and downlinking a signal of a cellular service and at least one second transceiver for uplinking a signal or data of at least one electrical element. The method also includes collecting data from the at least one second transceiver received from an electrical element, routing the collected data to an electrical element data collector configured to aggregate the collected data, determining adjustments to a device within the site based on the collected data and optimizing the device based on the collected data.

In some embodiments, the at least one second transceiver of the at least one of the plurality of remote antenna units is further configured to downlink a signal to the at least one electrical element. In some embodiments, the adjustments to the device are determined by an optimization controller. In some embodiments, the method further includes generating an electrical signal by the at least one electrical element upon occurrence of an event. In this situation, the element is a sensor selected from the group consisting of an accelerometer, a temperature sensor, a motion sensor, a consumption sensor, a utility meter, a power sensor, a power management sensor, a magnetic sensor, a pressure sensor, a proximity sensor, a direction sensor and a global positioning sensor. In some embodiments, the electrical element comprises a sensor element, a processor, a value register, a protocol module and a transmitter adapted for communicating with the at least one second transceiver. In some embodiments, the electrical element comprises a sensor element, a processor, a memory, a protocol module and a receiver/transmitter, the electrical element adapted for two-way communications with the at least one second transceiver.

In some embodiments, the electrical element further comprises at least one user equipment, the at least one user equipment further comprising a multiple application processor, a wireless service processor and a memory; each of the multiple application processor, the wireless service processor and the memory configured for communicating data to the at least one second transceiver of the remote antenna unit. In some embodiments, the at least one electrical element comprises a plurality of sensors. In some embodiments, the collected data comprises at least one datum selected from the group consisting of a temperature, a movement, an indicator of consumption, a direction, a magnetic field, a pressure, proximity and a location. In some embodiments, the method further includes accumulating and averaging the collected data over a period of time. In some embodiments, the method further comprising configuring a head end unit to uplink and downlink the signal of at least one cellular service and configuring the head end unit to uplink data from the electrical element. In some embodiments, the method further includes configuring the head end unit to downlink data to the electrical element. In some embodiments, the method further includes sending a signal to a third party based on a signal from the at least one electrical element.

Another embodiment of the present disclosure is a method. The method concerns automating a deployment site served by a distributed antenna system (DAS) for receiving at least one service from at least one base station, the distributed antenna system (DAS) comprising a head end unit (HEU) and a plurality of remote antenna units (RAU), the plurality of remote antenna units (RAU) being distributed over the deployment site, the head end unit (HEU) being configured for routing the at least one service to the plurality of remote antenna units (RAU). The method includes configuring the deployment site with a plurality of remote antenna units (RAU), at least one of the plurality of remote antenna units being configured with a first transceiver for uplinking and downlinking a signal of a cellular service and with at least one second transceiver for uplinking a signal or data of at least one electrical element. The method also includes collecting data from the at least one second transceiver received from an electrical element, routing the collected data to an electrical element data collector configured to aggregate the collected data. The method also includes determining adjustments to a remote device connected to the at least one electrical element based on the aggregated data and adjusting the remote device based on the aggregated data.

In some embodiments, the deployment site is a building. In some embodiments, the remote device is selected from the group consisting of a heating system, a ventilation system, an alarm system, an IoT system and a utility system.

The disclosure uses the capabilities of the WDS and DAS in a deployment or served site to monitor and control aspects of the deployment site via readily-connected user equipment and electrical elements. This disclosure takes advantage of an existing WDS/DAS infrastructure to support building automation and wireless sensors in general. In one aspect, the distributed antenna system includes one or more remote antenna units (RAU's), each RAU including a first wireless transceiver for cellular communications for user equipment served by the RAU. The RAU may also include one or more wireless transceivers or transmitters that communicate with wireless sensors using one or more of the wireless communication. standards used in this field and provides communication links between the wireless sensors and the building automation central controller. One advantage of the installed infrastructure of a wireless distribution system, including a distributed antenna system, is that the distributed antenna system becomes a shared resource between the wireless distribution system and an automated system for monitoring and controlling one or more aspects of the deployment site, without adding additional infrastructure. This sharing contributes to lower capital expenditures on startup and to lower operating expenses over time.

The resources that are shared between the distributed antenna system and the automation system mean that less infrastructure is needed, leading to lower capital costs to install the system. With less equipment and fewer wiring runs, less maintenance will be required, leading to lower operating costs. In addition, sharing the resources leads to more and better connections between the installed equipment and systems of the site, such as a building. These advantages embody one concept of the Internet of Things (IoT), in which the little added infrastructure for the building automation may be considered as an IoT infrastructure. The present disclosure thus advances an internet of things (IoT) concept for greater value and service to the users or occupants of the deployment site by better connecting devices, systems and services as described herein.

If the wireless protocol used by the remote antenna unit wireless sensor receiver/transmitter is one of the protocols used in mobile units such as WiFi or Bluetooth, an application run on a standard cellphone or a tablet can be used as a remote control for communicating with the IoT automation controller. This may be done, for example, for remotely controlling the temperature at a certain area of the building using a standard cellphone or a tablet. If the wireless protocol used by the wireless sensor transceiver is not a standard protocol used in mobile units (e.g. ZigBee™), the remote antenna unit may include an additional transceiver which uses a wireless protocol used by standard mobile units such as WiFi or Bluetooth.

Improvements suggested by the optimization controller may include altering power levels of one or more remote antenna units, switching antenna units to other sectors/layers, thus improving uplink performance among users, and the like.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An automation system comprising:
   a distributed antenna system (DAS) for receiving at least one cellular service from at least one base station, the distributed antenna system (DAS) comprising a head end unit (HEU) and a plurality of remote antenna units (RAU), the head end unit (HEU) being configured for routing the at least one cellular service to the plurality of remote antenna units (RAU);
   at least one of the plurality of remote antenna units comprising:
      a first transceiver configured for uplinking and downlinking a signal of a cellular service; and
      at least one second transceiver configured for uplinking a signal of at least one electrical element, the electrical element configured to generate an electrical signal on the occurrence of an event and to transmit the generated signal to the at least one second transceiver;
   a router configured for connecting to the at least one of the plurality of remote antenna units, the router configured for routing data from the at least one second transceiver received from the electrical element; and
   an automation controller configured to determine adjustments to the automation system based on the received electrical element data or on demand.

2. The automation system of claim 1, wherein the at least one second transceiver is further configured to downlink a signal to the electrical element.

3. The automation system of claim 1, further comprising at least one electrical element configured to generate an electrical signal on the occurrence of an event and to transmit the generated signal to the at least one second transceiver; wherein the electrical element is further configured to execute an instance of a data service configured to collect data on the event.

4. The automation system of claim 1, further comprising an electrical element data collector configured to store the collected electrical element data in an electrical data collector.

5. The automation system of claim 1, wherein the automation controller is further configured to correlate the collected electrical element data to determine adjustments to the automation system based on the correlated data.

6. The automation system of claim 3, wherein the electrical element comprises a sensor element, a processor, a value register, a protocol module, and a transmitter.

7. The automation system of claim 3, wherein the electrical element comprises a sensor element, a processor, a memory, a protocol module, and a transmitter/receiver.

8. The automation system of claim 3, wherein the electrical element comprises a processor, a value register, a protocol module, and a transmitter.

9. The automation system of claim 4, wherein the electrical data collector is located in the distributed antenna system (DAS), the head end unit (HEU) of the distributed antenna unit (DAS), or outside the distributed antenna system (DAS).

10. The automation system of claim 6, wherein the protocol module comprises circuitry and software to implement a protocol selected from the group consisting of Blue Tooth Low Energy (BLE) and long range related protocols (LoRa).

11. The automation system of claim 10, wherein the long range related protocols (LoRa) use frequencies in a sub-G domain of frequencies.

12. The automation system of claim 7, wherein the protocol module comprises circuitry and software to implement a protocol selected from the group consisting of Blue Tooth Low Energy (BLE), long range related protocols (LoRa), and WiFi.

13. The automation system of claim 1, wherein the at least one of the plurality of remote antenna units of the distributed antenna system (DAS) provides an Internet of Things (IoT) hub.

14. The automation system of claim 1, wherein the automation controller is further configured for performing optimization activities within a building, and wherein the optimization activities include instructing a change in configuration or control of at least one piece of building equipment.

15. The automation system of claim 14, wherein the collected data is mapped against criteria of the at least one building equipment for use in changing the settings of the at least one building equipment.

16. A method for automating a site served by a distributed antenna system (DAS) for receiving at least one service from at least one base station, the distributed antenna system (DAS) comprising a head end unit (HEU) and a plurality of remote antenna units (RAU), the plurality of remote antenna units (RAU) being distributed over the site, the head end unit (HEU) being configured for routing the at least one service to the plurality of remote antenna units (RAU), the method comprising:
configuring the site with a plurality of remote antenna units (RAU), at least one of the plurality of remote antenna units comprising a first transceiver for uplinking and downlinking a signal of a cellular service and at least one second transceiver for uplinking a signal of at least one electrical element;
collecting data from the at least one second transceiver received from an electrical element;
routing the collected data to an electrical element data collector configured to aggregate the collected data;
determining adjustments to a device within the site based on the collected data; and
optimizing the device based on the collected data.

17. The method of claim 16, wherein the at least one second transceiver of the at least one of the plurality of remote antenna units is further configured to downlink a signal to the at least one electrical element.

18. The method of claim 17, wherein the adjustments to the device are determined by an optimization controller.

19. The method of claim 16, wherein the electrical element is a sensor selected from the group consisting of an accelerometer, a temperature sensor, a motion sensor, a consumption sensor, a utility meter, a power sensor, a power management sensor, a magnetic sensor, a pressure sensor, a proximity sensor, a direction sensor and a global positioning sensor.

20. The method of claim 16, wherein the collected data comprises at least one datum selected from the group consisting of a temperature, a movement, an indicator of consumption, a direction, a magnetic field, a pressure, proximity and a location.

21. The method of claim 20, further comprising accumulating and averaging the collected data over a period of time.

22. The method of claim 20, further comprising locating the electrical element data collector at a remote location.

23. The method of claim 20, further comprising generating an electrical signal by the at least one electrical element upon occurrence of an event.

* * * * *

UNITED STATES PATENT AND TRADEMARK OFFICE
CERTIFICATE OF CORRECTION

PATENT NO. : 9,948,349 B2
APPLICATION NO. : 15/207759
DATED : April 17, 2018
INVENTOR(S) : Adi Malach It is certified that error appears in the above-identified patent and that said Letters Patent is hereby corrected as shown below:

On the Title Page

On page 8, Column 2, item (56), other publications, Line 4, delete "Duantum" and insert -- Quantum --.

On page 8, Column 2, item (56), other publications, Line 7, delete "Jniversity" and insert -- University --.

On page 9, Column 1, item (56), other publications, Line 37, delete "Jiatong" and insert -- Jiaotong --.

On page 10, Column 1, item (56), other publications, Line 11, delete "Acttion" and insert -- Action --.

On page 11, Column 1, item (56), other publications, Line 8, delete "n" and insert -- in --.

On page 11, Column 1, item (56), other publications, Line 16, delete "Transcations" and insert -- Transactions --.

Signed and Sealed this
Sixteenth Day of August, 2022

Katherine Kelly Vidal
*Director of the United States Patent and Trademark Office*